United States Patent
Naruse et al.

(10) Patent No.: US 9,811,035 B2
(45) Date of Patent: Nov. 7, 2017

(54) IMAGE FORMING APPARATUS AND RECORDING MATERIAL DISCRIMINATION UNIT

(71) Applicant: CANON KABUSHIKI KAISHA, Tokyo (JP)

(72) Inventors: Miki Naruse, Susono (JP); Masafumi Monde, Yokohama (JP); Tsutomu Ishida, Suntou-gun (JP); Kosuke Ogino, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/949,255

(22) Filed: Nov. 23, 2015

(65) Prior Publication Data

US 2016/0154357 A1   Jun. 2, 2016

(30) Foreign Application Priority Data

Nov. 28, 2014   (JP) ................................. 2014-242584
Sep. 9, 2015    (JP) ................................. 2015-177906

(51) Int. Cl.
*G06F 3/12*   (2006.01)
*G03G 15/00*  (2006.01)
(Continued)

(52) U.S. Cl.
CPC ..... *G03G 15/5029* (2013.01); *H04N 1/00092* (2013.01); *H04N 1/00986* (2013.01); *H04N 1/12* (2013.01); *G03G 15/1675* (2013.01); *G03G 15/2046* (2013.01); *G03G 2215/00949* (2013.01); *H04N 2201/0082* (2013.01)

(58) Field of Classification Search
None
See application file for complete search history.

(56) References Cited

U.S. PATENT DOCUMENTS 5,229,814 A *   7/1993  Hube ..................... G03G 15/50
                                              355/77
2002/0085186 A1* 7/2002  Sawada .................. G03B 27/52
                                              355/40
(Continued)

FOREIGN PATENT DOCUMENTS

JP   2005-345927 A   12/2005
JP   2007-55814 A    3/2007
(Continued)

*Primary Examiner* — Huo Long Chen
(74) *Attorney, Agent, or Firm* — Canon USA, Inc. I.P. Division

(57) ABSTRACT

An image forming apparatus includes an image formation unit, a detection unit, a storage unit, and a control unit. When the detection unit outputs a second output value when a second recording material, which is different from a first recording material is detected, in a state where the storage unit stores a first output value output by the detection unit upon detection of the first recording material, the control unit controls an image forming condition based on at least the first output value if a differential value between the first output value and the second output value is smaller than a predetermined threshold value and controls the image forming condition based on the second output value without using the first output value if the differential value is greater than the predetermined threshold value.

17 Claims, 23 Drawing Sheets

(51) Int. Cl.
    *H04N 1/12*     (2006.01)
    *H04N 1/00*     (2006.01)
    *G03G 15/16*     (2006.01)
    *G03G 15/20*     (2006.01)

(56) References Cited

U.S. PATENT DOCUMENTS

| | | | |
|---|---|---|---|
| 2007/0201105 A1* | 8/2007 | Shoda | H04N 1/4095 358/449 |
| 2010/0310261 A1* | 12/2010 | Matsushima | B65H 7/12 399/16 |
| 2011/0226061 A1* | 9/2011 | Itsumi | B65H 7/02 73/589 |
| 2012/0033243 A1* | 2/2012 | Nakazato | G03G 15/0131 358/1.13 |

FOREIGN PATENT DOCUMENTS

| | | |
|---|---|---|
| JP | 2007-206167 A | 8/2007 |
| JP | 2009-104039 A | 5/2009 |

\* cited by examiner

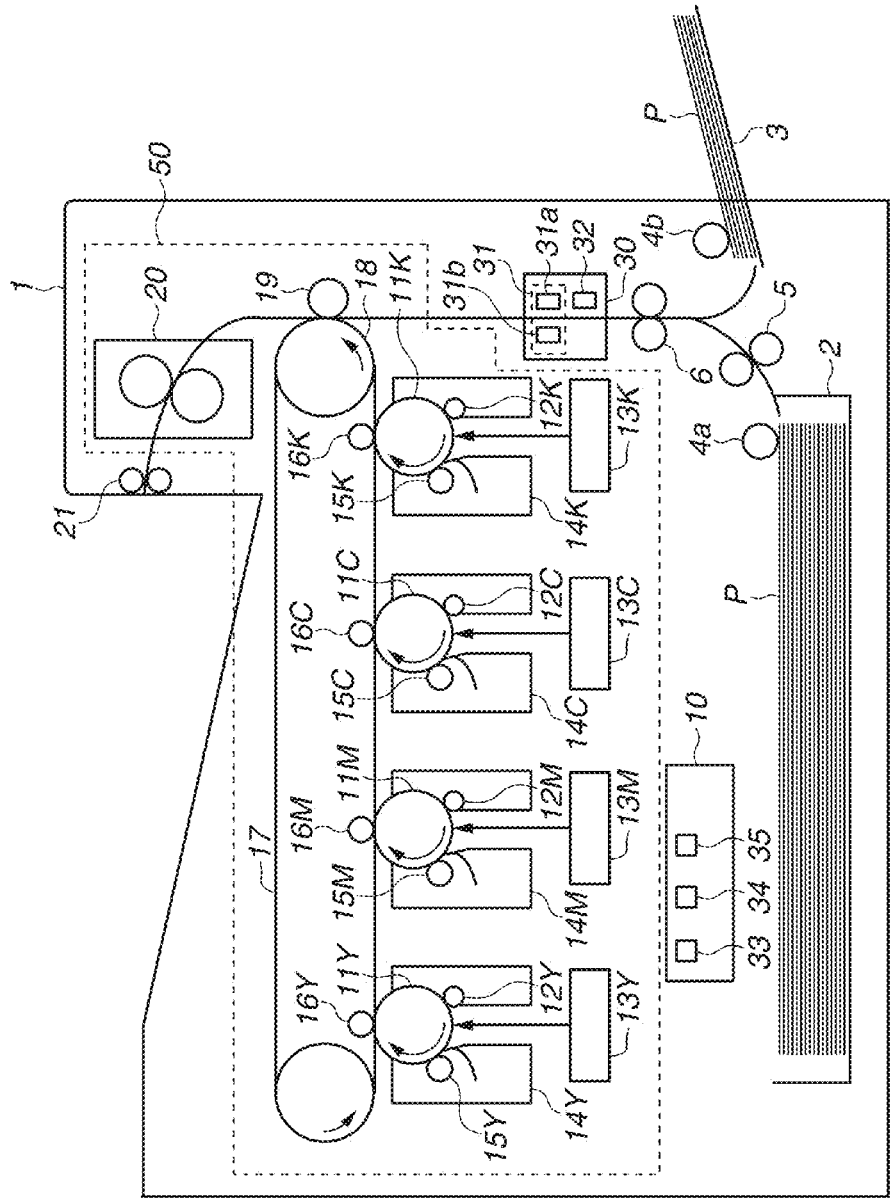

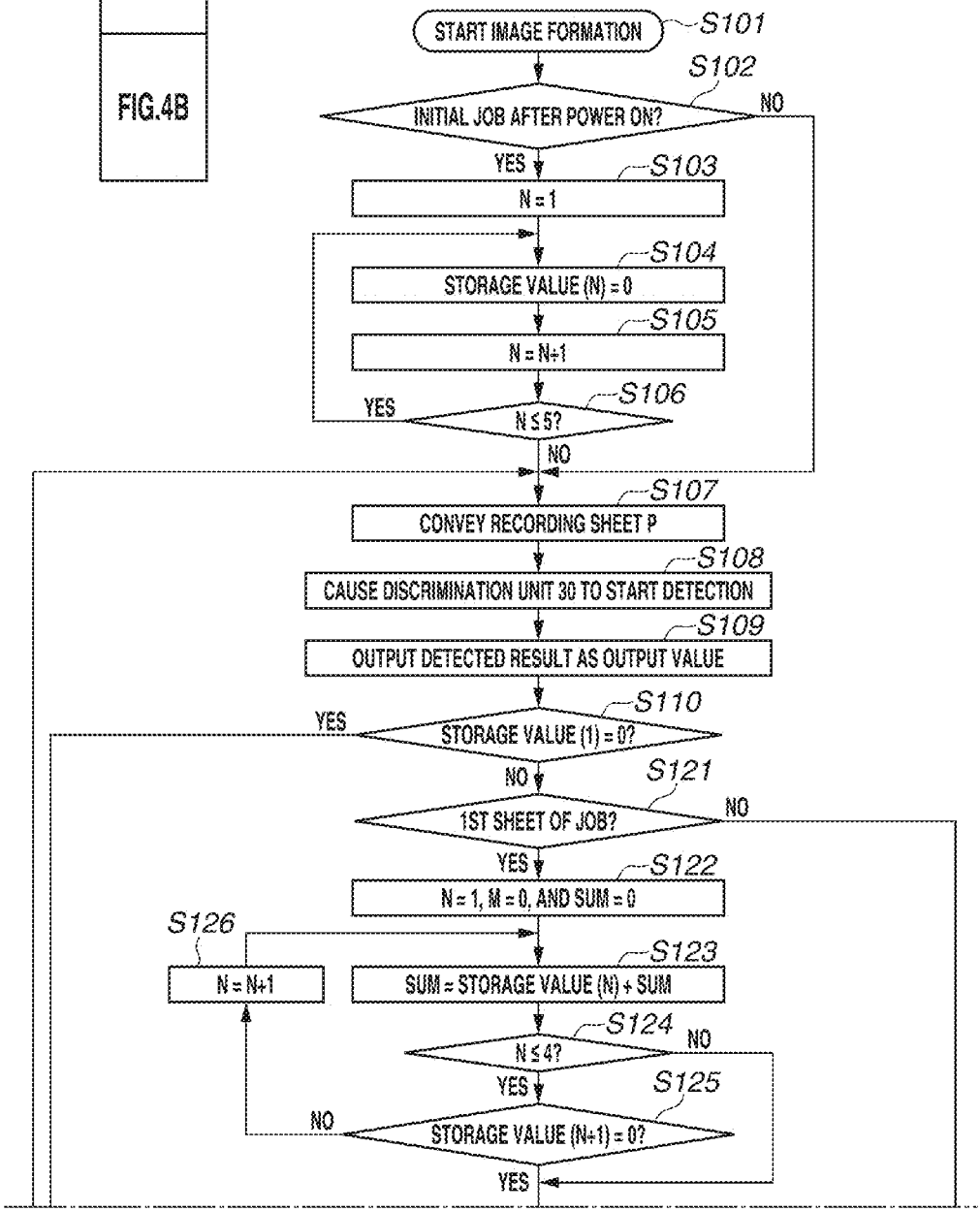

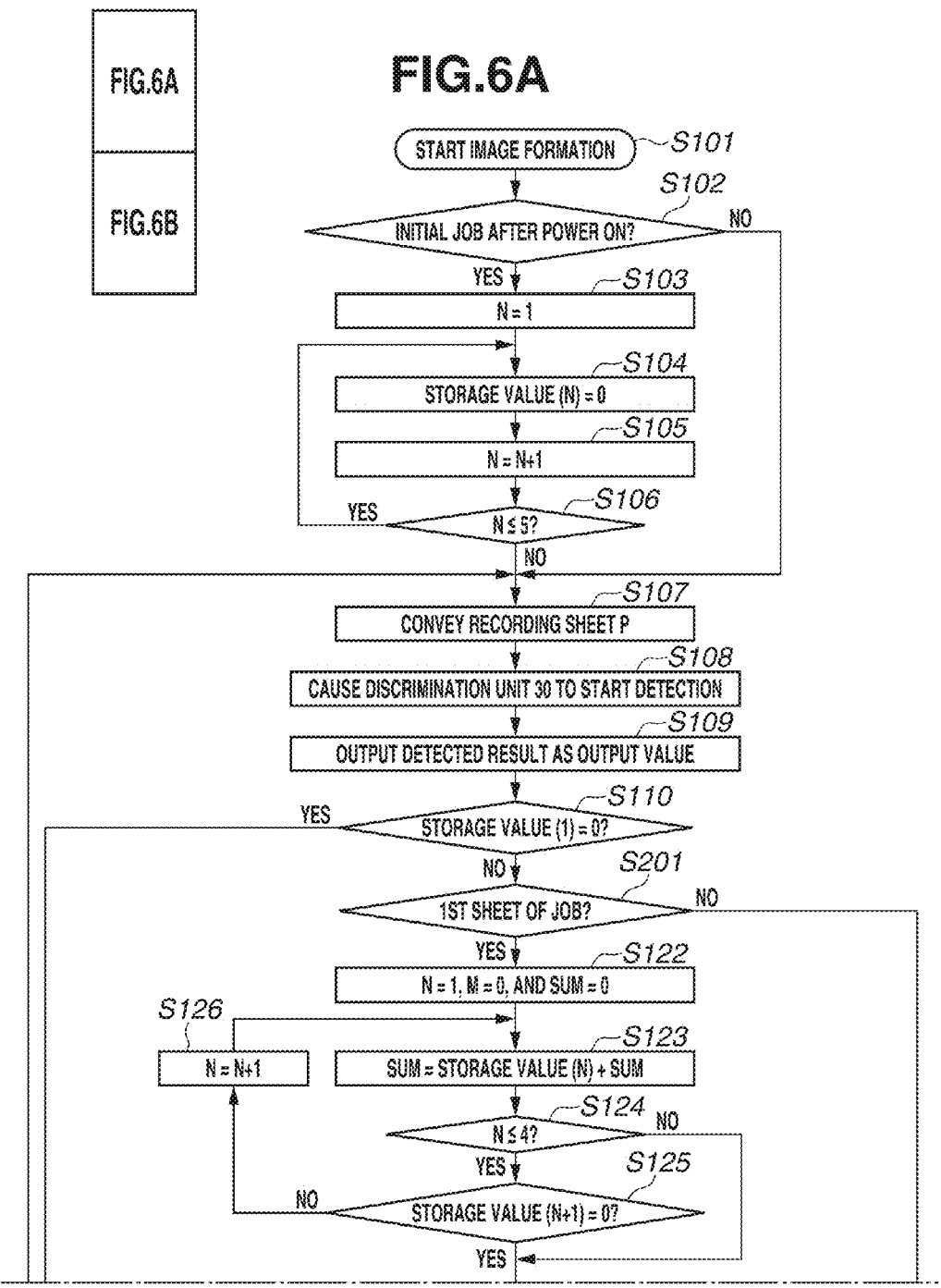

FIG.9

| STORAGE VALUE (OUTPUT VALUE) | | PAST SHEET NUMBER (N) | | | | |
|---|---|---|---|---|---|---|
| | | 1 (NEW) | 2 | 3 | 4 | 5 (OLD) |
| | 1 (= LETTER) | A(1, 1) | A(1, 2) | A(1, 3) | A(1, 4) | A(1, 5) |
| | 2 (= A4) | B(2, 1) | B(2, 2) | B(2, 3) | B(2, 4) | B(2, 5) |
| | ⋮ | | | ⋮ | | |
| | 26 (= C5 ENVELOPE) | Z(26, 1) | Z(26, 2) | Z(26, 3) | Z(26, 4) | Z(26, 5) |
| | RECORDING SHEET SIZE CODE (L) | | | | | |

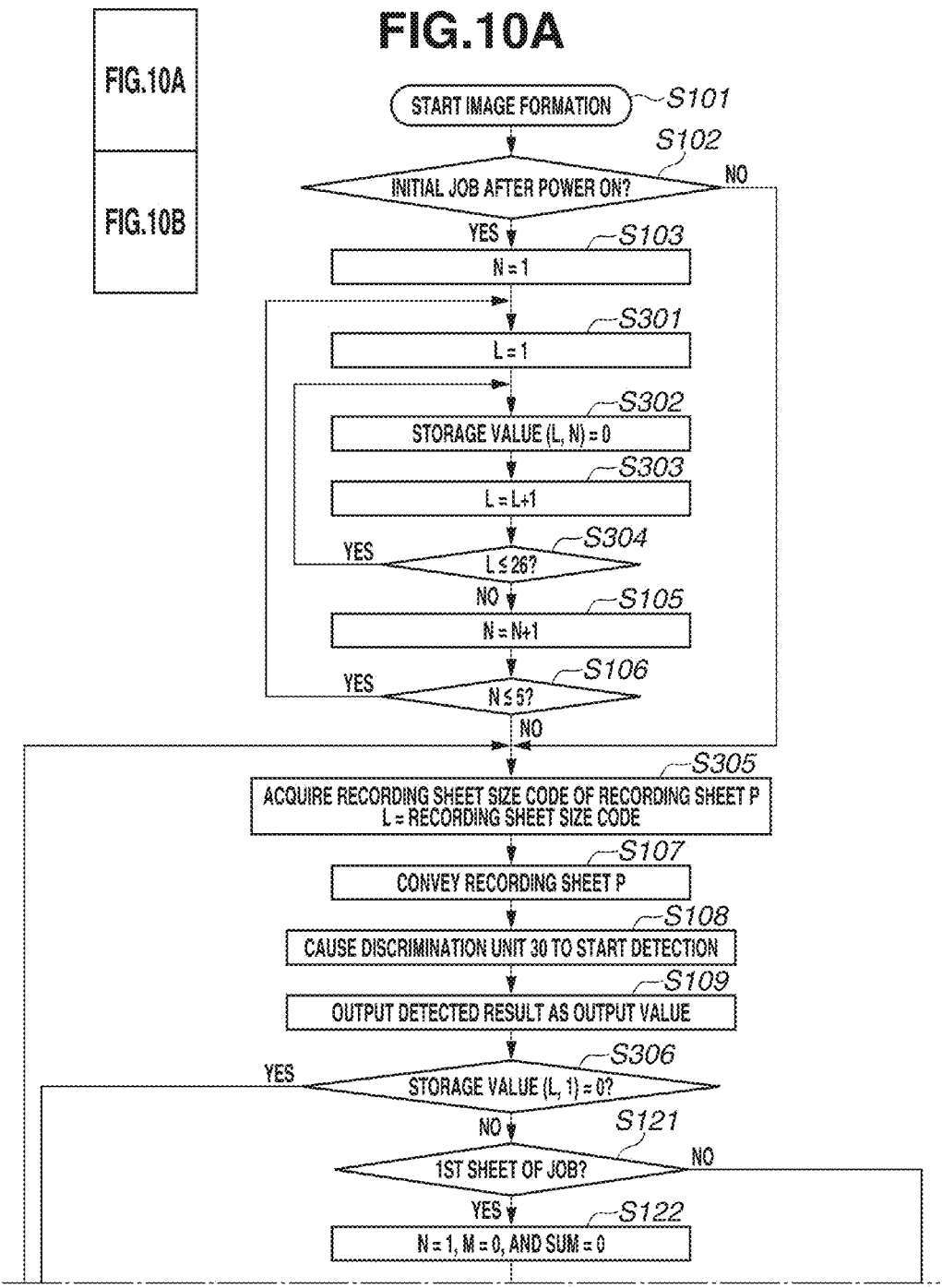

FIG.13

| STORAGE VALUE (OUTPUT VALUE) | | PAST SHEET NUMBER (N) | | | | |
|---|---|---|---|---|---|---|
| | USER CODE (U) | 1 (NEW) | 2 | 3 | 4 | 5 (OLD) |
| | 1 (= USER No. 1) | A (1, 1) | A (1, 2) | A (1, 3) | A (1, 4) | A (1, 5) |
| | 2 (= USER No. 2) | B (2, 1) | B (2, 2) | B (2, 3) | B (2, 4) | B (2, 5) |
| | ... | | | | | |
| | 26 (= USER No. 26) | Z (26, 1) | Z (26, 2) | Z (26, 3) | Z (26, 4) | Z (26, 5) |

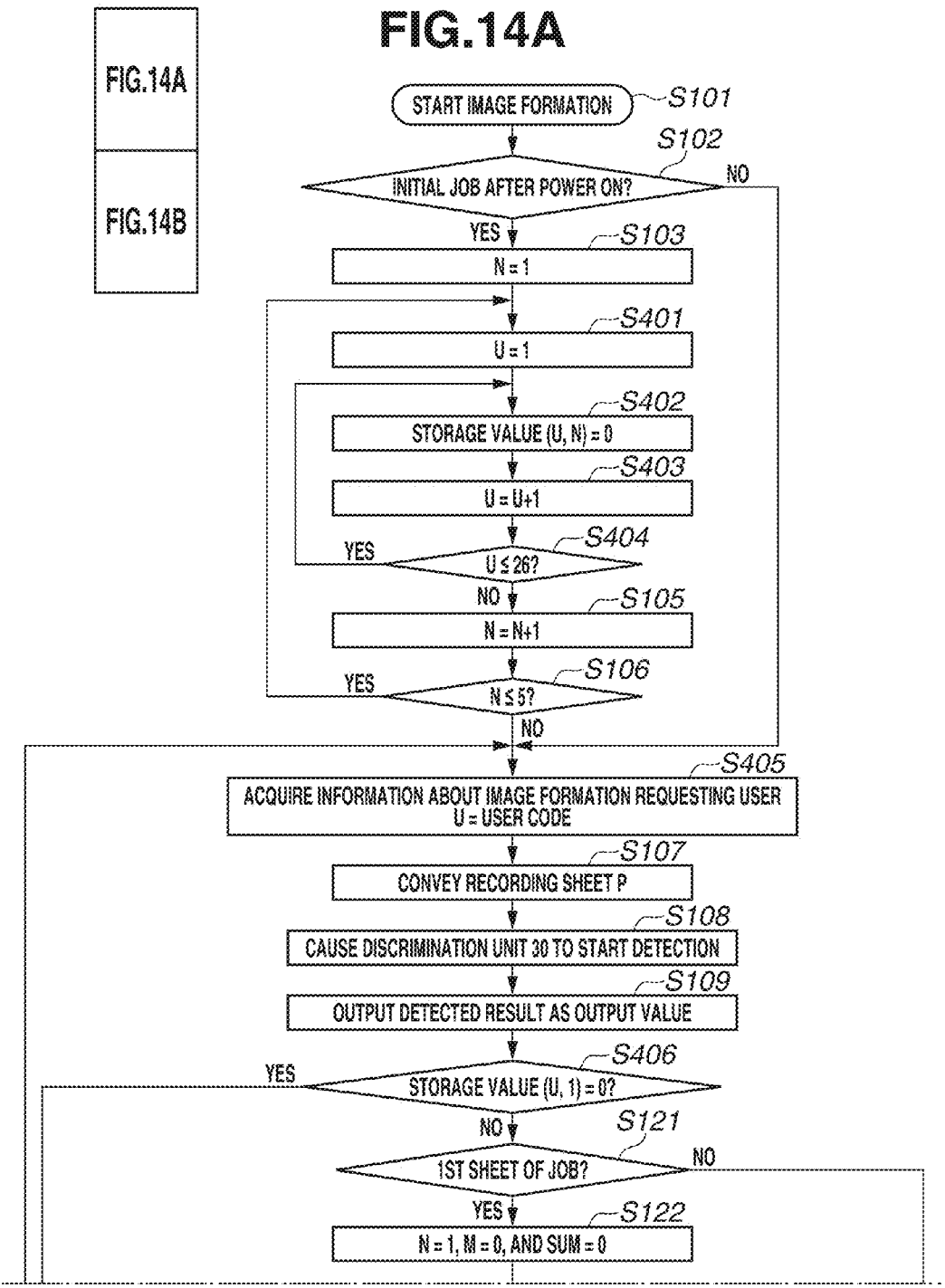

FIG.16

|  | PAST SHEET NUMBER (N) | | | | |
| --- | --- | --- | --- | --- | --- |
|  | 1 (NEW) | 2 | 3 | 4 | 5 (OLD) |
| STORAGE VALUE | A (1) | A (2) | A (3) | A (4) | A (5) |
| STORAGE DATE AND TIME | 2015/4/10 12:11:05 | 2015/4/10 12:11:00 | 2015/4/10 12:00:00 | 2015/4/2 11:00:00 | 2015/4/1 10:00:00 |

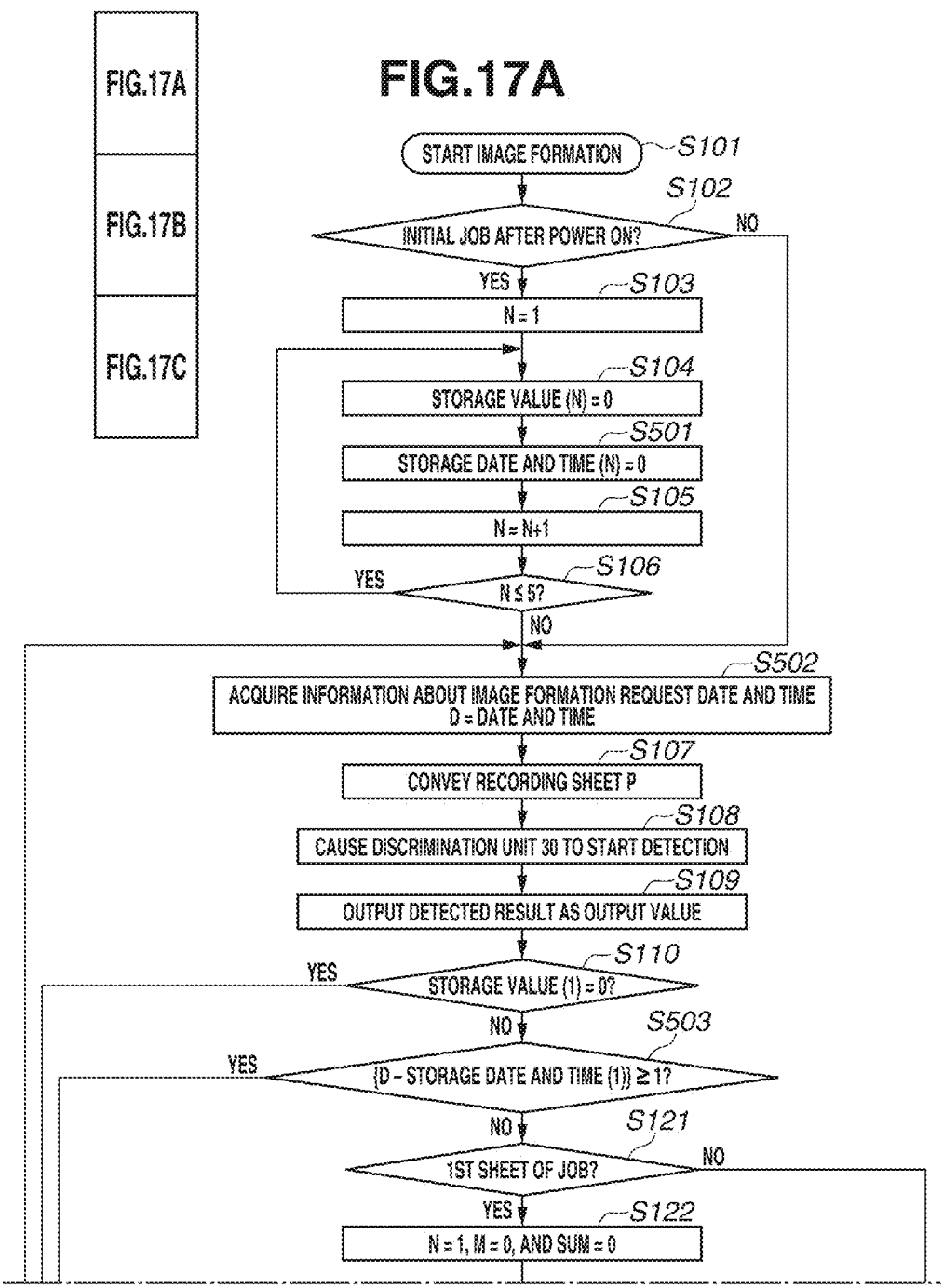

IMAGE FORMING APPARATUS AND RECORDING MATERIAL DISCRIMINATION UNIT

BACKGROUND OF THE INVENTION

Field of the Invention

The present invention relates to an apparatus that can accurately discriminate the type of a recording material.

Description of the Related Art

There is a conventional image forming apparatus (e.g., a copying machine or a printer) that is equipped with a sensor capable of discriminating the type of each recording material. More specifically, the image forming apparatus can automatically discriminate the type of each recording material and control transfer conditions (e.g., transfer voltage and conveyance speed of transferred recording material) and fixing conditions (e.g., fixing temperature and conveyance speed of fixed recording material) according to the discrimination result.

As discussed in Japanese Patent Application Laid-Open No. 2007-55814, there is a conventional image forming apparatus including a recording material discrimination unit capable of discriminating the type of a recording material by irradiating the recording material with light and capturing an image of the light having transmitted through the recording material and an image of the light reflected on the recording material. The above-mentioned image forming apparatus controls image forming conditions (e.g., transfer conditions and fixing conditions) according to the recording material type determined by the recording material discrimination unit. In a case where a plurality of recording sheets can be supplied from a specific accommodation section, the above-mentioned image forming apparatus discriminates the type of the plurality of recording sheets accommodated in the specific accommodation section based on a captured image of a first recording sheet and controls the image forming conditions based on the determined recording sheet type. The control performed by the above-mentioned image forming apparatus is based on the premise that the recording sheets are the same in type.

However, actual detection results obtained by the recording material discrimination unit may be variable due to influence of irregularities in manufacturing processes, even when the type of the recording sheets remains the same. The control discussed in Japanese Patent Application Laid-Open No. 2007-55814 intends to detect only one recording sheet. Therefore, deterioration may occur in accuracy of the recording material type discrimination. The image quality will deteriorate correspondingly. The control discussed in Japanese Patent Application Laid-Open No. 2007-55814 was satisfactory in the past. However, more improved accuracy in discriminating the recording material type is required to satisfy the requirements for recent advanced image qualities.

SUMMARY OF THE INVENTION

The present invention provides an image forming apparatus that can accurately discriminate the type of a recording material and can form a high-quality image.

The image forming apparatus according to the present invention includes an image formation unit configured to form an image on a recording material, a detection unit configured to detect the recording material and output an output value relating to characteristics of the recording material, a storage unit configured to store the output value output by the detection unit, and a control unit configured to control an image forming condition of the image formation unit based on the output value output by the detection unit, wherein when the detection unit detects a second recording material, which is different form a first recording material, and outputs a second output value in a state where the storage unit stores a first output value output by the detection unit upon detection of the first recording material, the control unit controls the image forming condition based on at least the first output value if a differential value between the first output value and the second output value is smaller than a predetermined threshold value and controls the image forming condition based on the second output value without using the first output value if the differential value is greater than the predetermined threshold value.

Further features of the present invention will become apparent from the following description of exemplary embodiments with reference to the attached drawings.

BRIEF DESCRIPTION OF THE DRAWINGS

FIG. 1 illustrates a configuration of an image forming apparatus according to an exemplary embodiment of the present invention.

FIG. 4, including FIG. 4A and FIG. 4B, is a flowchart illustrating image formation processing according to the first exemplary embodiment of the present invention.

FIG. 6, including FIG. 6A and FIG. 6B, is a flowchart illustrating image formation processing according to the second exemplary embodiment of the present invention.

FIG. 9 illustrates an example of storage values stored in the storage unit according to the third exemplary embodiment of the present invention.

FIG. 10, including FIG. 10A and FIG. 10B, is a flowchart illustrating image formation processing according to the third exemplary embodiment of the present invention.

FIG. 13 illustrates an example of storage values stored in the storage unit according to a fourth exemplary embodiment of the present invention.

FIG. 14, including FIG. 14A and FIG. 14B, is a flowchart illustrating image formation processing according to the fourth exemplary embodiment the present invention.

FIG. 16 illustrates an example of storage values stored in the storage unit according to the fifth exemplary embodiment of the present invention.

FIG. 17, including FIG. 17A, FIG. 17B, and FIG. 17C, is a flowchart illustrating image formation processing according to the fifth exemplary embodiment of the present invention.

DESCRIPTION OF THE EMBODIMENTS

Figure 2A:
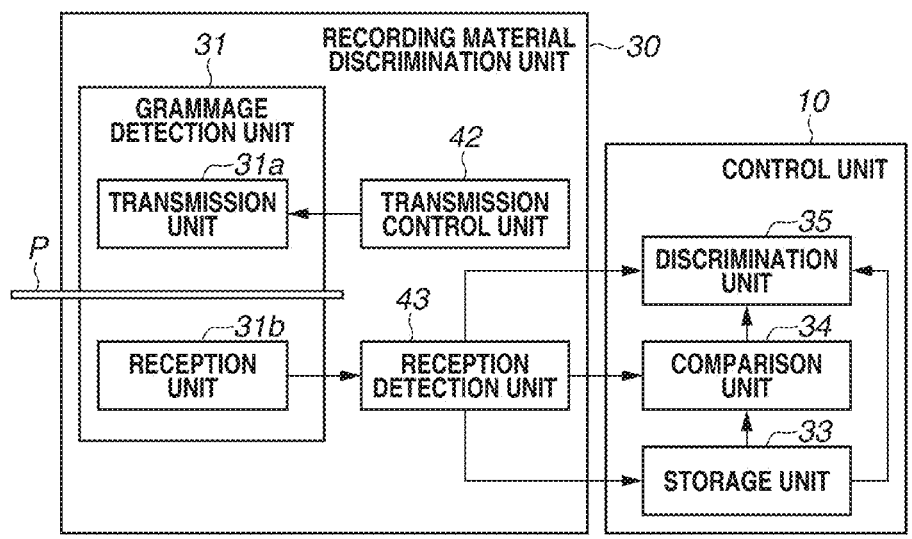
FIGS. 2A and 2B are block diagrams each illustrating a control system for a recording material discrimination unit according to an exemplary embodiment of the present invention.

Exemplary embodiments of the present invention will be described with reference to attached drawings. The following exemplary embodiments are mere examples and do not intend to narrowly limit the scope of the present invention.

An electrophotographic image forming apparatus according to a first exemplary embodiment will be schematically described. FIG. 1 illustrates a schematic configuration of an image forming apparatus 1 that includes an intermediate transfer belt 17 and an image formation unit 50 capable of forming an image on a recording sheet P.

The apparatus 1 is a tandem type color laser beam printer, which is configured to output a color image by overlapping yellow (Y), magenta (M), cyan (C), and black (K), i.e., four-color, toners (i.e., developers). A cassette 2 is an example of an accommodation section that can accommodate recording sheets P. A manual tray 3 is provided to enable a user to place one or a plurality of recording sheets P occasionally. Although not illustrated in FIG. 1, the apparatus 1 can include a plurality of optional apparatuses each capable of supplying recording sheets P. The apparatus 1 includes a supply roller 4a that can supply a recording sheet P from the cassette 2, a supply roller 4b that can supply a recording sheet P from the tray 3, a conveyance roller pair 5 that can convey the recording sheet P supplied by the roller 4a, and a registration roller pair 6.

Photosensitive drums 11Y, 11M, 11C, and 11K can bear respective color toners. Charge rollers 12Y, 12M, 12C, and 12K can uniformly charge the corresponding drums 11 at a predetermined potential. Laser scanners 13Y, 13M, 13C, and 13K can form electrostatic latent images on the corresponding drums 11. Process cartridges 14Y, 14M, 14C, and 14K can visualize the electrostatic latent images formed on respective drums 11. Developing rollers 15Y, 15M, 15C, and 15K can feed the toners from respective cartridges 14 to the corresponding drums 11. Primary transfer rollers 16Y, 16M, 16C, and 16K can primarily transfer color images formed on respective drums 11 to the belt 17. A drive roller 18 can drive (rotate) the belt 17. A secondary transfer roller 19 can transfer each image formed on the belt 17 to the recording sheet P. Two rollers 18 and 19 can form a nip portion. While a recording sheet is nipped at the nip portion and conveyed along a conveyance path, the image formed on the belt 17 can be transferred to the recording sheet. The rollers 16 and the roller 19 are examples of a transfer unit. A fixing device 20 is an example of a fixing unit configured to melt and fix the toner image secondarily transferred on the recording sheet P while the recording sheet P is conveyed along the conveyance path. The above-mentioned components, from the drums 11 to the fixing device 20, are examples that constitute the image formation unit 50.

A pair of discharge rollers 21 can discharge a recording sheet P to the outside of the apparatus 1 after the recording sheet P has been subjected to the fixing operation performed by the fixing device 20. A recording material discrimination unit 30 can discriminate the type of each recording sheet P having been conveyed along the conveyance path. In the present exemplary embodiment, the unit 30 includes a grammage detection unit 31 that can detect grammage of the recording sheet P and a surface property detection unit 32 that can detect surface property of the recording sheet P. The grammage detection unit 31 includes an ultrasonic wave transmission unit 31a and an ultrasonic wave reception unit 31b. Although not illustrated, a control unit 10 is constituted by a micro-processing unit (MPU), which includes a central processing unit (CPU). The control unit 10 can control various operations to be performed by the apparatus 1. The control unit 10 includes a storage unit 33, a comparison unit 34, and a discrimination unit 35. The storage unit 33 can store detection results obtained by the detection units 31 and 32. The comparison unit 34 can compare new detection results obtained by the detection units 31 and 32 with past detection results stored in the storage unit 33. The discrimination unit 35 can discriminate the type of each recording sheet P with reference to the comparison result obtained by the comparison unit 34. Further, the control unit 10 can control electrophotographic processes, determine a print mode according to the type of each recording sheet P determined by the discrimination unit 35, and control various image forming conditions. In the present exemplary embodiment, the image forming condition includes conveyance speed of the recording sheet P, voltages applied to the rollers 16 and 19, currents flowing across the rollers 16 and 19, and temperature in the fixing operation performed by the fixing device 20 to fix an image on the recording sheet P. Further, an example of the image forming condition that can be controlled by the control unit 10 is rotational speeds of respective rollers 16 and in an image transfer operations. Further, another example of the image forming condition that can be controlled by the control unit 10 is rotational speed of a fixing roller included in the fixing device 20 in an image fixing operation.

Figure 2B:
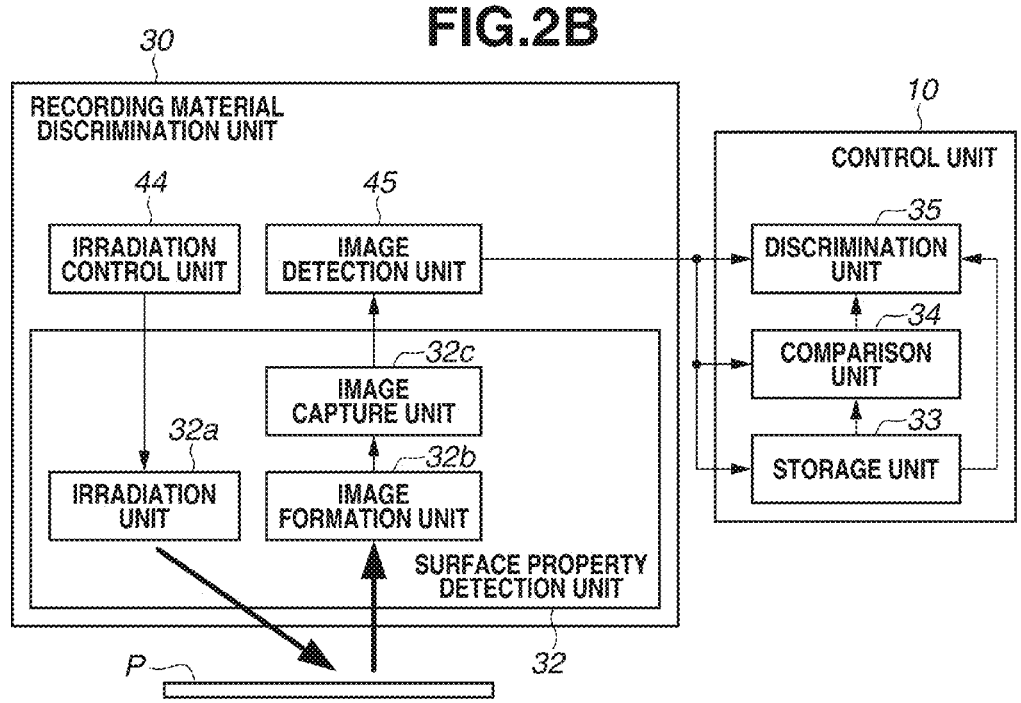

The unit 30 having recording sheet type discrimination capability according to the present exemplary embodiment will be described in detail below with reference to FIGS. 2A and 2B. FIG. 2A is a block diagram illustrating the unit 30 constituted by the detection unit 31. FIG. 2B is a block diagram illustrating the unit 30 constituted by the detection unit 32.

Although in the present exemplary embodiment, the unit 30 includes the detection unit 31 and the detection unit 32, the unit 30 may be configured to include at least one of the detection unit 31 and the detection unit 32. Alternatively, instead of using the detection unit 31 or 32, the unit 30 can be configured to include a detection unit configured to detect the thickness of each recording sheet based on the light quantity of light transmitted through the recording sheet when the recording sheet is irradiated with light. Alternatively, instead of using the detection unit 31 or 32, the unit 30 can be configured to include a detection unit configured to detect the surface property of each recording sheet based on the light quantity of light transmitted through the recording sheet when the recording sheet is irradiated with light. Then, the control unit 10 can discriminate the type of the recording sheet P based on the output values from the above-mentioned detection units and control the image forming conditions.

The detection unit 31 illustrated in FIG. 2A is constituted by the transmission unit 31a that can transmit ultrasonic waves and the reception unit 31b that can receive ultrasonic waves. The transmission unit 31a and the reception unit 31b are disposed in an opposed relationship. When the recording sheet P is conveyed into a clearance between the transmission unit 31a and the reception unit 31b, the control unit 10 outputs a start signal that instructs transmitting ultrasonic waves to a transmission control unit 42. In the present exemplary embodiment, the clearance between the transmission unit 31a and the reception unit 31b (i.e., detection position of the detection unit 31) is a position where the ultrasonic waves transmitted from the transmission unit 31a pass through. The transmission unit 31a transmits ultrasonic waves of specific frequency toward the recording sheet P under the control of the control unit 42. The reception unit 31b has the role of receiving the ultrasonic waves transmitted through the recording sheet P. A reception detection unit 43 can output a reception signal, which represents a peak value of the signal having been output based on the ultrasonic waves received by the reception unit 31b, to the control unit 10. The control unit 10 detects grammage of the recording sheet P based on the received signal. After receiving the detection result, the control unit 10 outputs a stop signal that instructs terminating the transmission of ultrasonic waves to the control unit 42. Then, for example, if the detected grammage of the recording sheet P is small, the control unit 10 determines that the type of the recording sheet P is thin paper. If the detected grammage of the recording sheet P is large, the control unit 10 determines that the type of the recording sheet P is thick paper.

In the process of transmitting through the recording sheet P, the ultrasonic waves attenuate in peak value of the waveform according to the grammage of the recording sheet P. For example, when the recording sheet P is thin paper having a smaller grammage, the peak value of the ultrasonic waves is relatively larger. On the other hand, when the recording sheet P is a thick paper having a larger grammage, the peak value of the ultrasonic waves becomes smaller. The following is effects obtainable when the control unit 10 appropriately sets the fixing temperature of the fixing device 20 according to the detected grammage. For example, when the recording sheet P is a thin paper having a smaller grammage, it is feasible to reduce the required electric power by setting a lower fixing temperature. On the other hand, when the recording sheet P is a thick paper having a greater grammage, it is feasible to improve the fixity by setting a higher fixing temperature or lowering the conveyance speed of the recording sheet P. As mentioned above, the control unit 10 controls the image forming condition of the apparatus 1 based on the grammage detection result. Further, the control unit 10 can directly control the image forming condition of the apparatus 1 based on the received signal value without detecting the grammage of the recording sheet P, or without causing the discrimination unit 35 to discriminate the type of the recording sheet P.

The detection unit 32 illustrated in FIG. 2B is constituted by an irradiation unit 32a, an image formation unit 32b, and an image capture unit 32c. The irradiation unit 32a can irradiate a surface of the recording sheet P with light. The image formation unit 32b can form an image of reflection light reflected on the surface of the recording sheet P when the light has been emitted from the irradiation unit 32a. The image capture unit 32c is a light receiving unit configured to receive the light of which image has been formed by the image formation unit 32b. The image capture unit 32c can capture an image of the received light. If the recording sheet P is conveyed at a constant speed until it reaches a detection position of the detection unit 32, the control unit 10 outputs a light irradiation start signal to an irradiation control unit 44. In the present exemplary embodiment, the detection position of the detection unit 32 is a position where the recording sheet P can be irradiated with the light emitted from the irradiation unit 32a. The irradiation unit 32a irradiates the surface of the recording sheet P with light under the control of the control unit 44. To adjust the focal length to the recording sheet P, the configuration includes a mechanism for pushing a back surface of the recording sheet P by a roller (not illustrated) or the like so that the conveyance position can be fixed. The image capture unit 32c captures an image of the light, when the recording sheet P is irradiated with the light, via the image formation unit 32b. In the present exemplary embodiment, the image capture unit 32c is a line sensor extending in the width direction of the recording sheet. Using the line sensor enables to perform an image capturing operation while the recording sheet P is conveyed. The image capture unit 32c outputs the captured image (i.e., an image of the surface of the recording sheet P) to an image detection unit 45. The image detection unit 45 outputs a reception signal to the control unit 10 according image data. The reception signal is, for example, a differential value between a maximum density value and a minimum density value included in the image data or any other information relating to the surface property. The control unit 10 detects the surface property of the recording sheet P based on the received signal. The control unit 10 outputs a light irradiation stop signal to the control unit 44 if the control unit 10 obtains each detection result. Then, if the detected surface of the recording sheet P is rough, the control unit 10 determines that the type of the recording sheet P is rough paper. If the surface of the recording sheet P is smooth, the control unit 10 determines that the type of the recording sheet P is coated paper.

The image to be captured is variable depending on the surface property (unevenness) of the recording sheet P. For example, in a case where the recording sheet P is a rough paper having a rough surface, a captured image will include more shades formed by the light. On the other hand, in a case where the recording sheet P is a coated paper having a relatively smooth surface, the ratio of shades will be relatively small. The coated paper, i.e., the recording sheet surface property of which is smooth, is relatively low in resistance value. Therefore, compared to the rough paper (i.e., the recording sheet having a rough surface), the coated paper requires a greater amount of transfer current and higher transfer voltage to transfer toners. Therefore, it is effective for the control unit 10 to control the transfer current or the transfer voltage according to the detection result indicating the surface property, in such a way as to improve the image quality. As mentioned above, the control unit 10 controls the image forming condition of the apparatus 1 based on the detection result relating to the surface property. Further, the control unit 10 can directly control the image forming condition of the apparatus 1 based on the received signal value without detecting the surface property of the recording sheet P, or without causing the discrimination unit 35 to discriminate the type of the recording sheet P.

Next, a method for discriminating the recording sheet P according to the present exemplary embodiment will be described in detail below. In the present exemplary embodiment, a group of recording sheets is collectively managed as a job if images thereof can be formed based on a single print instruction. When the apparatus 1 starts an image forming operation according to a print instruction, the apparatus 1 performs a startup operation of a motor (not illustrated) and continuously forms images on recording sheets P that belong to the same job group. Then, the apparatus 1 stops the motor to terminate the image forming operation. In the present exemplary embodiment, it is assumed that the recording sheets P are supplied from the tray 3. Compared to the cassette 2, a user can easily set various types of recording sheets on the tray 3 because the tray 3 is located outside the apparatus 1. Therefore, there is a higher possibility that a user may change the type of a recording sheet in each job. However, even in such a configuration, a user may repetitively place the same type of recording sheets P on the tray 3. In this case, the accuracy in discriminating the type of each recording sheet P can be improved by effectively using past detection results.

Figure 3:
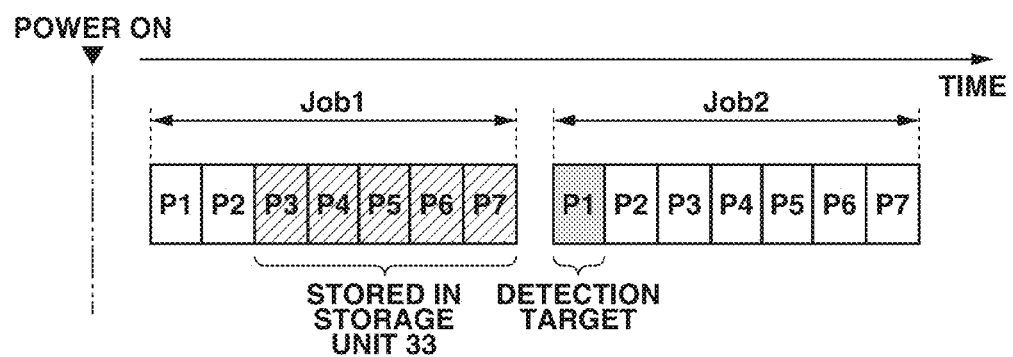
FIG. 3 illustrates a relationship between a target recording sheet to be detected and other recording sheets of which detection results are stored in a storage unit according to a first exemplary embodiment of the present invention.

Accordingly, the method for discriminating the recording sheet P according to the present exemplary embodiment includes a step of causing the control unit 10 to determine whether to use detection results (i.e., output values) of latest five recording sheets stored in the storage unit 33. In the present exemplary embodiment, the numeral "five" is a mere example of the number of sheets. If accurately discriminating the type of the recording sheet P is feasible with a smaller number of sheets, the numeral "five" can be changed to a smaller numerical value. If there is a sufficient storage space in the storage unit 33, the numeral "five" can be changed to a larger numerical value. Further, it can be configured to enable a user to set the number of sheets arbitrarily. FIG. 3 illustrates a target recording sheet to be detected in relation to other recording sheets of which detection results are stored in the storage unit according to the present exemplary embodiment. In FIG. 3, "P" stands for a recording sheet and each recording sheet can be supplied from the tray 3 according to the order designated by a numeral attached to "P." For example, FIG. 3 illustrates a first recording sheet P1 of a first job Job1 and a second recording sheet P2 of the first job Job1. In the present exemplary embodiment, the type of a recording sheet P1 of a second job Job2 is determined with reference to detection results of latest five recording sheets (i.e., P3 through P7 of Job1).

Figure 4B:
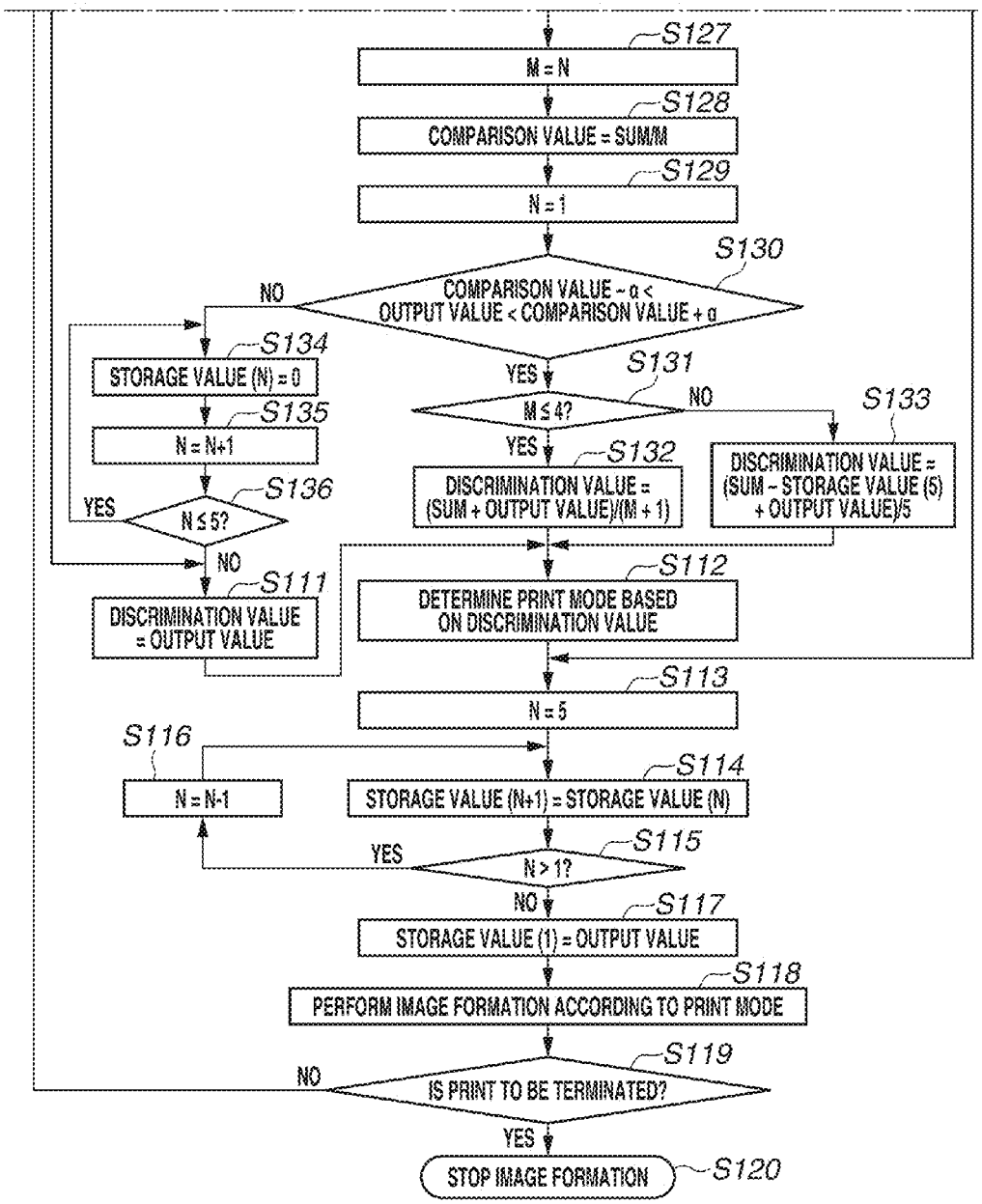

FIG. 4 is a flowchart illustrating image formation processing that can be performed by the control unit 10 according to the present exemplary embodiment. The control unit 10 performs a control according to the flowchart illustrated in FIG. 4 based on the program stored in the ROM (not illustrated). First, in step S101, the control unit 10 starts an image forming operation in response to each print instruction. Then in step S102, namely after starting the image forming operation, the control unit 10 confirms whether the present job is a job which is initially performed after the power source has been turned on. If the control unit 10 determines that the present job is not the job initially performed after the power source has been turned on (NO in step S102), the operation proceeds to step S107.

On the other hand, if the control unit 10 determines that the present job is the job which is initially performed after the power source has been turned on (YES in step S102), then in steps S103 to S106, the control unit 10 performs a work for initializing the data stored in the storage unit 33. According to the example illustrated in FIG. 3, the first job Job1 is the job which is initially performed after the power source has been turned on. In step S103, N represents a counter usable in a flow count-up operation. In step S104, the storage value is a data relating to the type of the recording sheet P stored in the storage unit 33. The storage unit 33 can store storage values for five sheets. In the sequential processing in steps S103 to S106, the control unit 10 initializes all data of the five sheets. When a numerical value suffixed to the storage value is (1), the storage value is the latest data. When the numerical value in parentheses is larger, the storage value is an older data.

If the above-mentioned data initialization for the storage unit 33 is completed, then in step S107, the control unit 10 outputs an instruction to feed the first recording sheet P from the tray 3 and causes the apparatus 1 to convey the recording sheet P to a setup position of the unit 30 (i.e., detection position of the detection unit 31, or detection position of the detection unit 32). Then, in step S108, the control unit 10 controls the unit 30 to start an operation to detect the recording sheet P while the recording sheet P is conveyed. Further, in step S109, the control unit 10 outputs output values relating to the grammage and the surface property of the recording sheet P. If the above-mentioned detection of the recording sheet P is completed, then in step S110, the control unit 10 determines whether the storage value (1) stored in the storage unit 33 is 0. If the control unit 10 determines that the storage value (1) is not the job initially performed after the power source has been turned on (NO in step S110), there is an output value already stored in the storage unit 33, namely storage value (1)≠0. Therefore, the operation proceeds to step S121.

When the present job is the job initially performed after the power source has been turned on, the storage unit 33 is in an initialized state (in other words, the storage unit 33 stores no data). Therefore, the control unit 10 determines that the storage value (1) is 0 (YES in step S110). The operation proceeds to step S111. In step S111, a discrimination value to be used by the discrimination unit 35 in discriminating the type of the recording sheet P is set to the output value having been output in step S109. Then, in step S112, the control unit 10 determines a print mode of the apparatus 1 based on the type of the recording sheet P determined by the discrimination unit 35 with reference to the above-mentioned discrimination value. Subsequently, in step S113, the control unit 10 sets the counter N to an initial value (N=5). In steps S114 to S116, the control unit 10 repeats a work for updating the data stored for the five sheets from storage value (N) to storage value (N+1). Further, in step S117, the control unit 10 stores the output value of the presently detected recording sheet P as the storage value (1). In step S118, the apparatus 1 performs an image forming operation according to the print mode determined in step S112. Subsequently, in step S119, the control unit 10 determines whether the print of the recording sheet P terminates. If the control unit 10 determines that the print terminates (YES in step S119), then in step S120, the control unit 10 terminates the image forming operation.

In a case where the apparatus 1 does not stop the print (NO in step S119), namely when the apparatus 1 continuously prints the second and subsequent recording sheets P (see P2 and subsequent sheets of the first job Job1 illustrated in FIG. 3), the operation returns to step S107. In steps S107 to S109, the control unit 10 causes the apparatus 1 to feed the next recording sheet P and controls the unit 30 to start a detection operation for the newly supplied recording sheet P, and then outputs output values. When the apparatus 1 prints the second or subsequent recording sheets P, the storage value (1) is already updated by the output value of the first recording sheet P (NO in step S110). Therefore, the operation proceeds to step S121. In step S121, the control unit 10 confirms whether the detection target recording sheet P is the first recording sheet P of a job. When the operation proceeds to step S121, since the job has been initially performed after the power source has been turned on, the detection target recording sheet P is the second or subsequent recording sheet P of the job. Therefore, the discrimination unit 35 does not newly perform the operation for discriminating the type of the recording sheet P. Then, in steps S113 to S117, the control unit 10 causes the storage unit 33 to store the obtained output values and performs the work for updating the data of storage values (1) through (5) similar to that performed for the first sheet. In many cases, if the job remains the same, the apparatus 1 performs printing with the same type of recording sheets P. Therefore, if the present job is the initial job performed after the power source has been turned on, then in step S118, the apparatus 1 performs image forming operations for the second and subsequent recording sheets P based on the print mode determined for the first sheet. Subsequently, in step S119, the control unit 10 determines whether the print of the recording sheet P terminates. If the control unit 10 determines that the print does not terminate (NO in step S119), the operation returns to step S107. The control unit 10 repeats the above-mentioned processing.

Subsequently, an operation that can be performed by the apparatus 1 when the control unit 10 determines that the present job is not the job initially performed after the power source has been turned on (NO in step S102) will be described in detail below. According to the example illustrated in FIG. 3, the second job Job2 is not the job initially performed after the power source has been turned on. In steps S107 to S109, similar to the processing performed for the job Job1 initially performed after the power source has been turned on, the control unit 10 causes the apparatus 1 to feed the first recording sheet P from the tray 3 and instructs the unit 30 to detect the recording sheet P and output corresponding output values. If the detection of the recording sheet P is completed, then in step S110, the control unit 10 determines whether the storage value (1) stored in the storage unit 33 is 0. In this case, at least one of the data relating to the previous job (Job1) is stored as the storage value (1) (NO in step S110). Therefore, the operation proceeds to step S121. In step S121, the control unit 10 determines that the present detection target recording sheet P is the first recording sheet P of the job (YES in step S121). Therefore, the operation proceeds to step S122.

In steps S122 to S128, the control unit 10 calculates an average value of the storage values stored in the storage unit 33. As described above, N represents the counter usable in the flow count-up operation. Further, M represents the number of storage values, not including 0, stored in the storage unit 33. In the present exemplary embodiment, the maximum value of M is 5. However, the maximum value of M can be set arbitrarily considering discrimination accuracy and adjustment accuracy. The storage unit 33 stores an average value of the storage values calculated in this flow as a comparison value. Then, in step S129, the control unit 10 returns the counter N value to 1 before causing the comparison unit 34 to perform comparison processing. Next, in step S130, the control unit 10 determines whether the obtained output value is within the range of the comparison value±α, in which α is a threshold value that can be determined considering the variable range of the output value due to irregularities in manufacturing the recording sheets P. In the present exemplary embodiment, the threshold value α is within ±9% of the comparison value.

When the present output value is within the range of the comparison value±9%, more specifically when the output value of the present recording sheet P is close to the storage values of latest five recording sheets P detected in the past, it is conceivable that the present recording sheet P and the recording sheets P used in the previous job are the same type. Accordingly, in addition to the output value of the present recording sheet P, it is feasible to use the storage values stored in the storage unit 33 as the discrimination value to be referred to in discriminating the type of the recording sheet P. Increasing the number of sampled sheets as mentioned above can improve the discrimination accuracy in discriminating the type of the recording sheet P, compared to a case where only one sheet is referred to in the discrimination. In the present exemplary embodiment, if a differential value between the present output value and the comparison value is smaller than the threshold value α, the control unit 10 uses an average value of the detection results of the latest recording sheets P of up to five including the present output value, as the discrimination value. More specifically, the control unit 10 calculates the discrimination value to be used in discriminating the type of the recording sheet P based on the value M having been set in step S127. In step S131, the control unit 10 determines whether the value M is equal to or less than 4. If the value M is equal to or less than 4 (YES in step S131), then in step S132, the control unit 10 adds the output value to the sum value and then divides the addition result by M+1 to obtain the discrimination value. If the value M is equal to 5 (NO in step S131), then in step S133, since the oldest storage value (5) is unnecessary, the control unit 10 subtracts the storage value (5) from the sum value and adds the output value and then divides the addition result by M to obtain the discrimination value. According to the example illustrated in FIG. 3, the control unit 10 can calculate the discrimination value for the first sheet P1 of the second job Job2 based on the storage values of four sheets P4 to P7 of the first job Job1 and the output value of the first sheet P1 of the second job Job2. Through the above-mentioned processing, it is feasible to calculate the discrimination value with reference to data of the latest sheets of up to five including the output value.

On the other hand, in a case where the output value is not included in the range of comparison value±9%, more specifically when the output value of the present recording sheet P is not close to the data of the latest five recording sheets P detected in the past, it is presumed that the type of the present recording sheet P is different from that of the recording sheet P used in the previous job. Therefore, the control unit 10 cannot use the storage values stored in the storage unit 33 as the discrimination value of the discrimination unit 35. In the present exemplary embodiment, if the differential value between the present output value and the comparison value is equal to or greater than the threshold value, the control unit 10 discards the storage values stored in the storage unit 33 and performs initialize processing in steps S134 through S136. Initializing the data as mentioned above is useful to prevent a later calculated comparison value from changing due to the influence of a detection result of a different type of recording sheet P. The discrimination value to be used by the discrimination unit in this case is the output value of the present recording sheet P (see step S111). In step S112, the control unit 10 discriminates the type of the recording sheet P with reference to the discrimination value calculated as mentioned above and determines the print mode. A control to be performed subsequently by the unit 10 is similar to the control for the above-mentioned job initially performed after the power source has been turned on. Further, in the present exemplary embodiment, if the differential value between the output value and the comparison value is equal to the threshold value, the control unit 10 can perform the control in step S131 instead of performing the control in step S134. More specifically, in such a case, the control unit 10 can discriminate the type of the recording sheet P with reference to past detection results or, the control unit 10 can discriminate the type of the recording sheet P without taking the past detection results into consideration.

As mentioned above, the image forming apparatus according to the present exemplary embodiment compares a detection result of the target recording sheet P with detection results (i.e., storage values) of the latest five recording sheets P obtained in the past and determines a discrimination value to be used in the discrimination of the type with reference to the comparison result. More specifically, the image forming apparatus according to the present exemplary embodiment can accurately discriminate the type of each recording sheet by using past detection results if necessary and can form a high-quality image based on the discrimination result.

Figure 5:
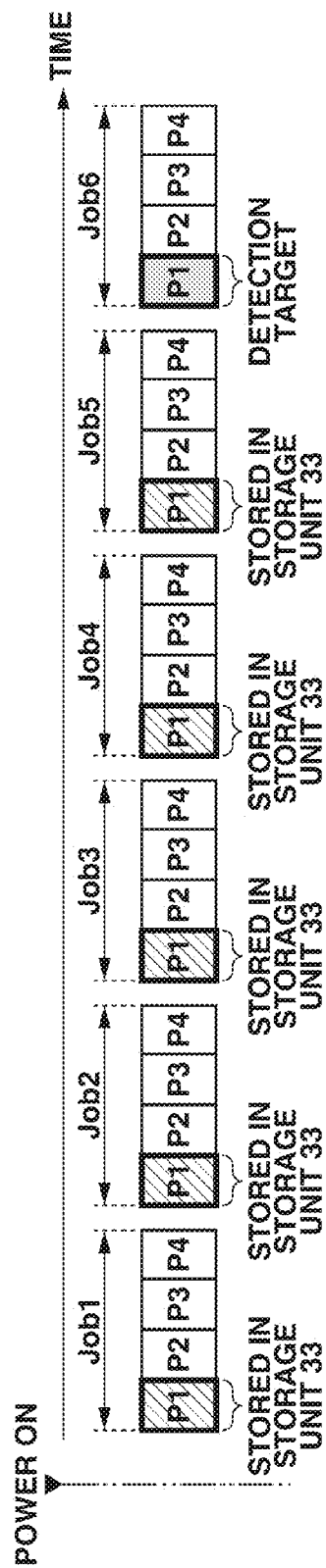
FIG. 5 illustrates a relationship between a target recording sheet to be detected and other recording sheets of which detection results are stored in the storage unit according to a second exemplary embodiment of the present invention.

Next, a method for discriminating the recording sheet P according to a second exemplary embodiment will be described in detail below. The discrimination method according to the second exemplary embodiment includes some features similar to those described in the first exemplary embodiment. Therefore, only unique features not described in the first exemplary embodiment will be described in detail below. In the present exemplary embodiment, the image forming apparatus uses detection results (i.e., storage values) of, at most, five of the first sheets of the job stored in the storage unit 33. In the present exemplary embodiment, the unit 30 is configured to include at least the detection unit 32. FIG. 5 illustrates a target recording sheet to be detected in relation to other recording sheets of which detection results are stored in the storage unit according to the present exemplary embodiment. In the present exemplary embodiment, the image forming apparatus discriminates the type of the first recording sheet P1 of the Job6, with reference to detection results of the first sheets P1 of Job1 through Job 5, respectively.

Figure 6B:
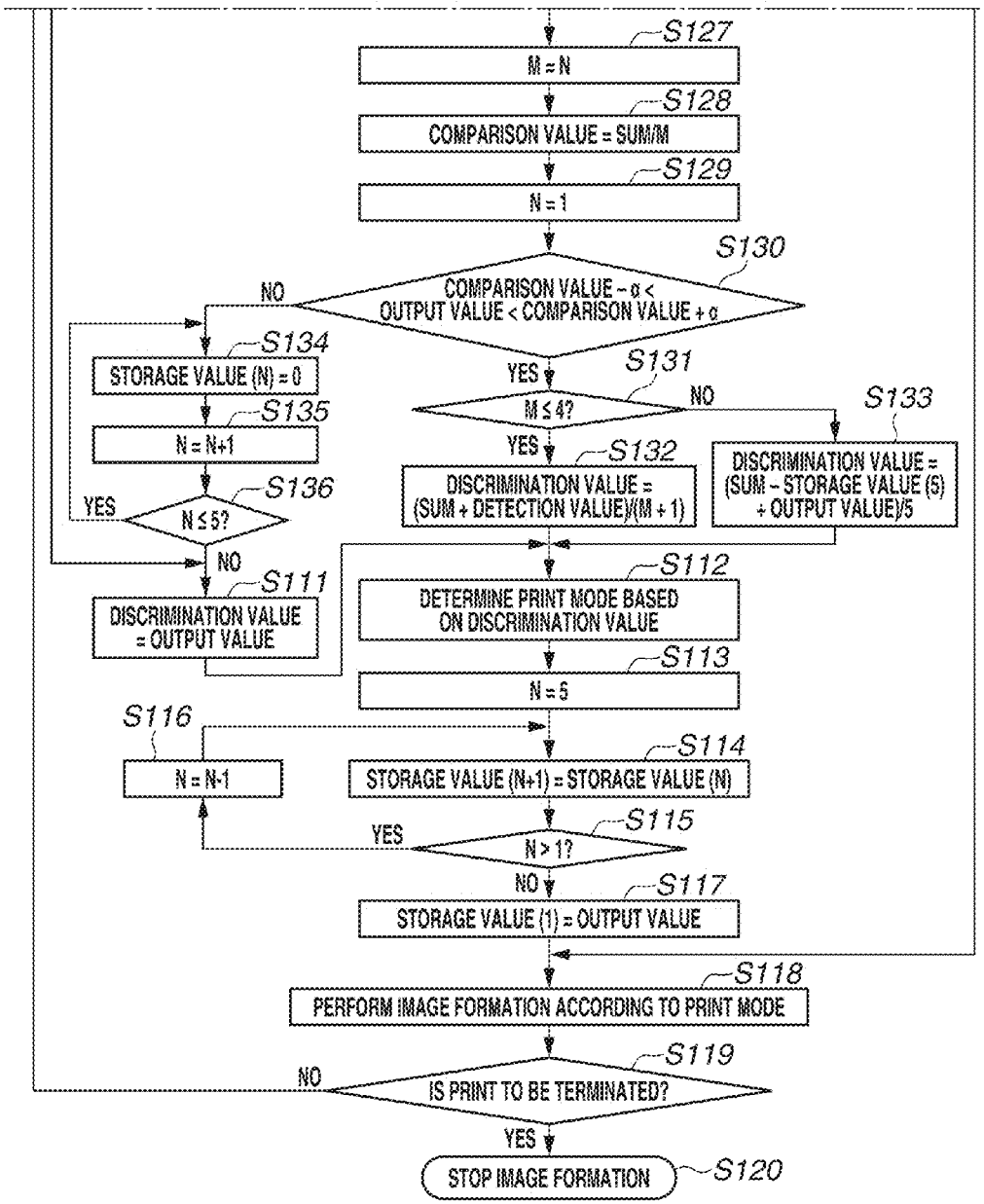

FIG. 6 is a flowchart illustrating image formation processing that can be performed by the control unit 10 according to the present exemplary embodiment. The control unit 10 performs control according to the flowchart illustrated in FIG. 6 based on the program stored in the ROM (not illustrated). The flowchart illustrated in FIG. 6 is different from the flowchart illustrated in FIG. 4 in the step of detecting the second and subsequent sheets of each job. In the present exemplary embodiment, if the control unit 10 determines that the target recording sheet P to be detected is not the first recording sheet P of the job, namely when the target recording sheet is the second or subsequent sheet of each job in the example illustrated in FIG. 5 (NO in step S201), then in step S118, the image forming apparatus performs an image forming operation according to the print mode determined for the first sheet of the job without storing any output value in the storage unit 33. More specifically, the storage values stored in the storage unit 33 are only the output values of the first sheets of respective jobs.

The reason will be described in detail below. In a case where the control unit 10 discriminates the type of each recording sheet based on the detection result of the first recording sheet P and controls the conveyance speed of the recording sheet as an image forming condition, there will be a possibility that the conveyance speed of the second or subsequent recording sheet P may differ from the conveyance speed of the first recording sheet P of the job. As mentioned above, the detection unit 32 includes the line sensor serving as an imaging unit configured to capture an image of the recording sheet P while the recording sheet P is conveyed. To capture an image accurately with the line sensor, it is important to convey the recording sheet P at a constant speed. In a state where the type of the recording sheet P is unknown, the image forming apparatus conveys the first recording sheet P of each job at the same conveyance speed (e.g., 1/1 speed=ordinary speed). On the other hand, if the type of the recording sheet P of the job has been discriminated, the image forming apparatus sets an appropriate conveyance speed for conveying the second or subsequent recording sheet according to the detected type. Therefore, the conveyance speed of the recording sheet P changes when the job proceeds from the first sheet to the second sheet, namely the detection condition of the line sensor changes. Therefore, a slight difference may arise in the detection result between the first and second sheets of the job even when the type of recording sheet P remains the same. To solve the above-mentioned problem, the image forming apparatus stores output values of up to five sheets in the storage unit 33 only for the first sheet of each job so that the comparison unit 34 can use the stored value as the comparison value. Then, if it is confirmed that the present output value is similar to the past storage values as a result of the comparison, the image forming apparatus obtains the discrimination value of the recording sheet P by using the storage values of the first sheets of respective jobs up to five sheets including the output value. Storing the output values of only the first sheets of respective jobs as mentioned above is useful because the image forming apparatus can constantly use the output values obtained under the same measurement conditions. Therefore, the present exemplary embodiment provides a discrimination method capable of obtaining a much more accurate discrimination result of each recording sheet P compared to the recording material discrimination method described in the first exemplary embodiment.

As mentioned above, the image forming apparatus according to the present exemplary embodiment compares the detection result of the target recording sheet P with the detection results (i.e., the storage values) of the first recording sheets of up to five past jobs and determines the discrimination value to be used in discriminating the type according to the comparison result. More specifically, the image forming apparatus can accurately discriminate the type of each recording sheet with reference to past detection results stored beforehand, if necessary, and can form a high-quality image.

In the above-mentioned exemplary embodiment, it is feasible to combine the control according to the first exemplary embodiment with the control according to the second exemplary embodiment. More specifically, if the control unit 10 determines that it is unnecessary to change the conveyance speed of the second or subsequent recording sheet P from the conveyance speed of the first recording sheet P (e.g., 1/1 speed if the recording sheet P is a plain paper), the control unit 10 performs the control according to the first exemplary embodiment. Alternatively, if the control unit 10 determines that it is necessary to change the conveyance speed for the second or subsequent recording sheet P to an appropriate speed (e.g., 1/3 speed if the recording sheet P is a thick paper), the control unit 10 performs the control according to the second exemplary embodiment. As mentioned above, it is feasible to get merits of respective controls by appropriately switching the control if necessary. More specifically, performing the control according to the first exemplary embodiment is useful to acquire a greater number of samples at an early stage. Further, performing the control according to the second exemplary embodiment is useful to perform the detection accurately with the line sensor. Further, even when the control unit 10 determines that it is unnecessary to change the conveyance speed of the recording sheet P when the job proceeds from the first sheet to the second or subsequent sheet, the control unit can perform the control according to the second exemplary embodiment.

Next, a method for discriminating the recording sheet P according to a third exemplary embodiment will be described in detail below. The discrimination method according to the third exemplary embodiment includes some features similar to those described in the first exemplary embodiment. Therefore, only unique features not described in the first exemplary embodiment will be described in detail below. In the present exemplary embodiment, the control unit 10 stores a detection result (i.e., a storage value) in the storage unit 33 for each recording sheet size. The control unit 10 uses a storage value selected from the storage values if a designated size of the recording sheet P is identical.

Figure 8A:
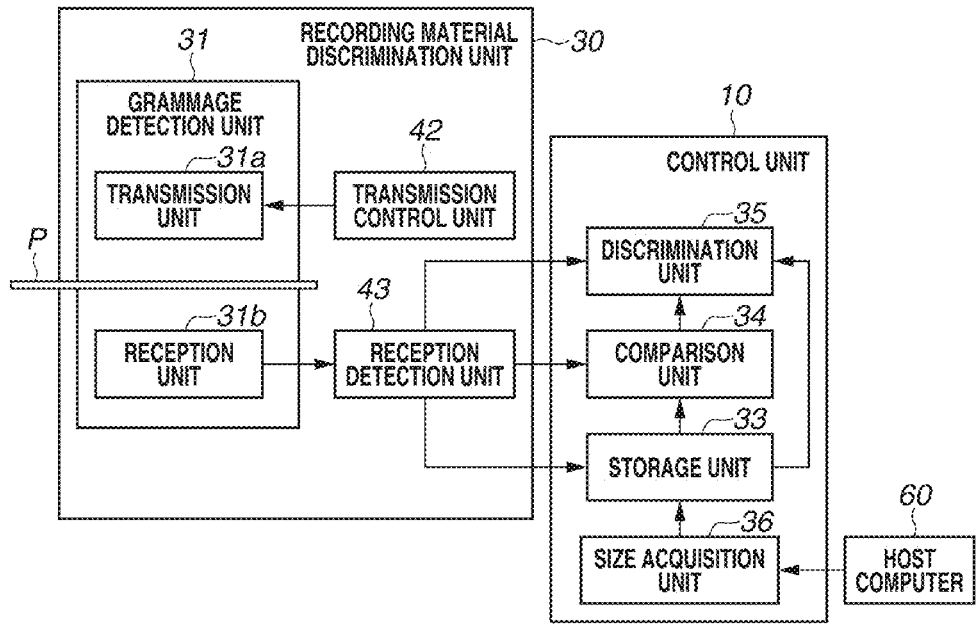
FIGS. 8A and 8B are block diagrams each illustrating a control system for the recording material discrimination unit according to a third exemplary embodiment of the present invention.
Figure 8B:
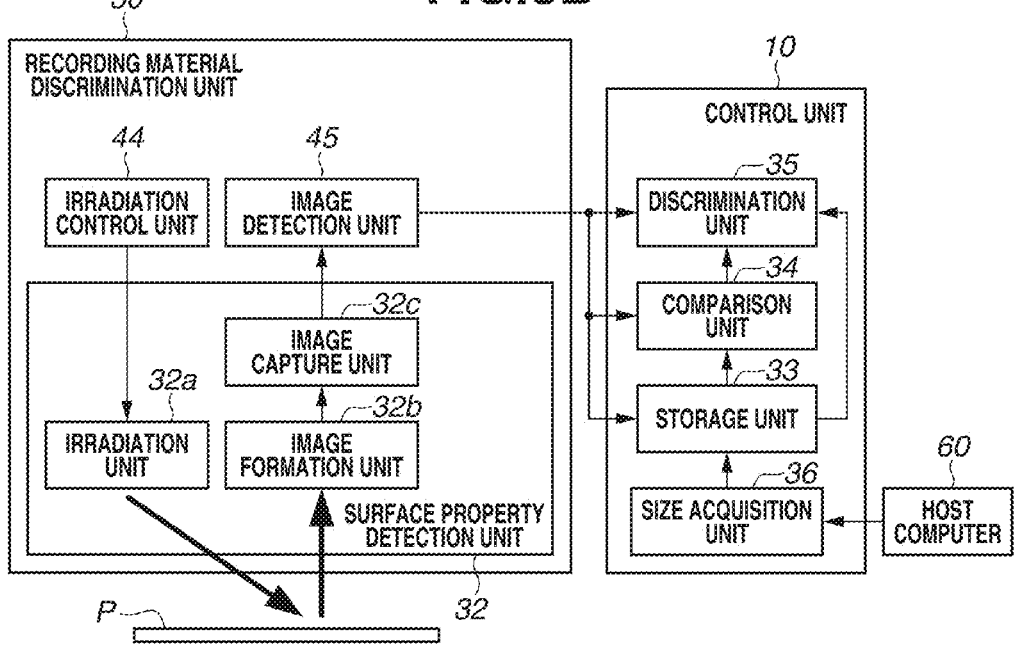

The control unit 10 that can control the image forming condition of the recording sheet P according to the present exemplary embodiment will be described in detail below with reference to FIGS. 8A and 8B. FIG. 8A is a block diagram illustrating a control system for the unit 30 that is constituted by the grammage detection unit 31. FIG. 8B is a block diagram illustrating a control system for the unit 30 that is constituted by the surface property detection unit 32. In the present exemplary embodiment, the unit 30 can be configured to include at least one of the detection unit 31 and the detection unit 32.

The control unit 10 according to the present exemplary embodiment includes the storage unit 33, the comparison unit 34, the discrimination unit 35, and a size acquisition unit 36. The size acquisition unit 36 can acquire a recording sheet size code corresponding to the size (e.g., paper length and/or width) of the recording sheet P from the host computer 60 (i.e., an external device) that instructs the apparatus 1 to perform an image forming operation, before the apparatus 1 starts an image forming operation. The recording sheet size codes are prescribed beforehand for various standard sizes of recording sheets. The storage unit 33 stores detection results obtained by the detection unit 31 or the detection unit 32 for each recording sheet size code L acquired by the size acquisition unit 36, as illustrated in FIG. 9.

The table illustrated in FIG. 9 stores detection results for each of 26 types of recording sheet size codes L. In FIG. 9, the number of types is a mere example. Therefore, the number of types can be greater than 26 if there is a sufficient storage space in the storage unit 33. Further, instead of referring to the recording sheet size codes corresponding to various recording sheet sizes, the table can be configured to store detection results for predetermined lengths in the conveyance direction of the recording sheet as well as predetermined lengths in the width direction perpendicular to the conveyance direction. Further, the table can be configured to store detection results for only the predetermined lengths in the conveyance direction of the recording sheet or the predetermined lengths in the width direction perpendicular to the conveyance direction.

The comparison unit 34 compares a new detection result obtained by the detection unit 31 or the detection unit 32 with the past detection results stored in the storage unit 33 that are identical to the recording sheet P in recording sheet size code L. The discrimination unit 35 discriminates the type of the recording sheet P with reference to the comparison result obtained by the comparison unit 34.

Figure 10B:
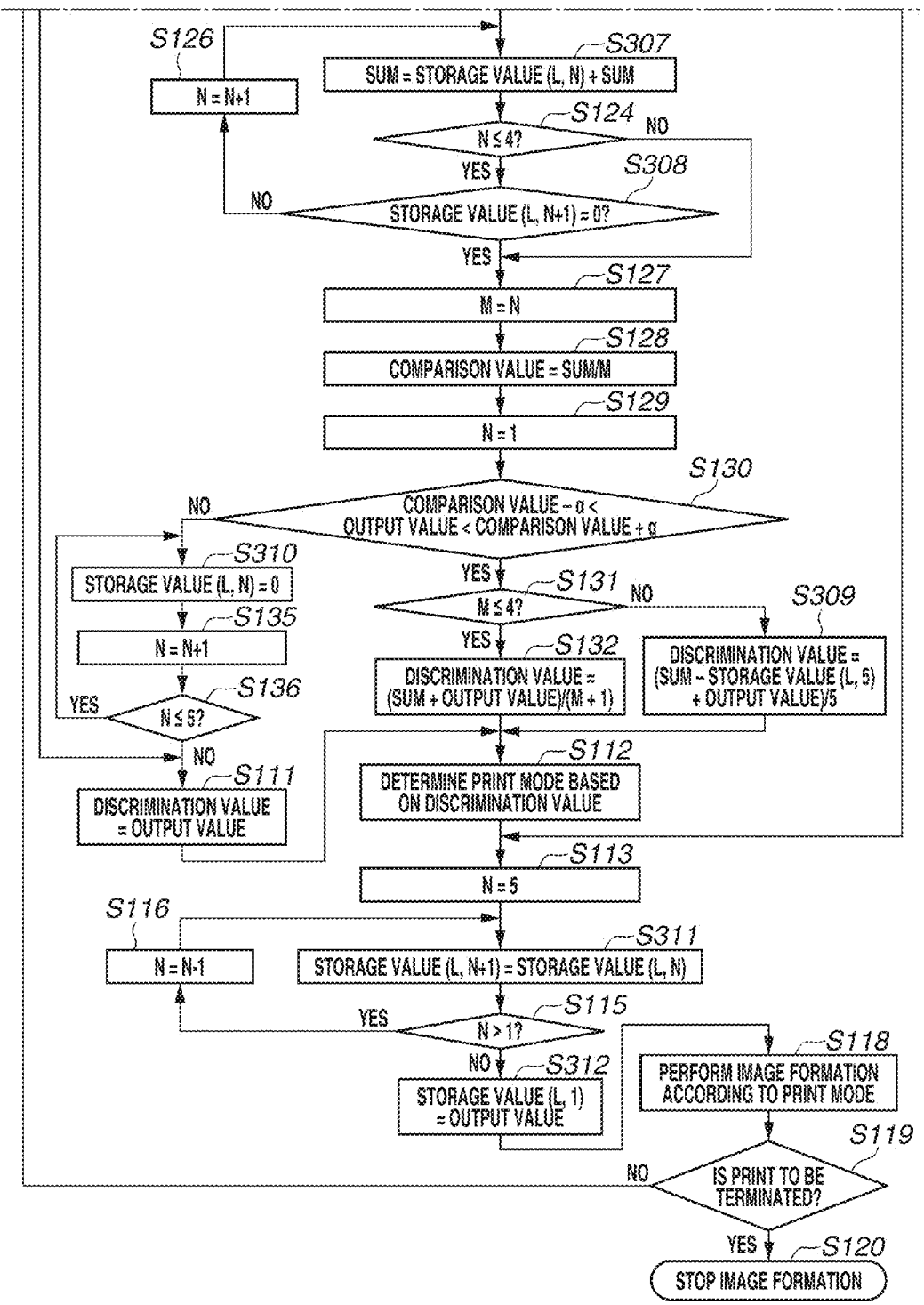

FIG. 10 is a flowchart illustrating image formation processing that can be performed by the control unit 10 according to the present exemplary embodiment. The control unit 10 performs control according to the flowchart illustrated in FIG. 10 based on the program stored in the ROM (not illustrated). The flowchart illustrated in FIG. 10 is different from the flowchart illustrated in FIG. 4 in the processing of the control unit 10 that performs a work for initializing the data stored in the storage unit 33 when the present job is the job initially performed after the power source has been turned on (see steps S301 to S304). Further, the flowchart illustrated in FIG. 10 is characteristic in that the control unit 10 acquires the recording sheet size code L of the recording sheet P from the size acquisition unit 36 (see step S305) and the control unit 10 refers to the storage values corresponding to respective recording sheet size codes L stored in the storage unit 33 (see steps S306 to S312). In the present exemplary embodiment, the storage unit 33 can store storage values of five sheets for each recording sheet size code. In respective steps S103, S301 to S304, S105, and S106, the control unit 10 initializes all data of 130 sheets (=26 types×five sheets). Next, in step S305, the control unit acquires the recording sheet size code L of the recording sheet P from the size acquisition unit 36. In the following steps S306 to S312, the control unit 10 uses the past storage values stored in the storage unit 33 that are identical to the recording sheet P in recording sheet size code L.

Figure 11:
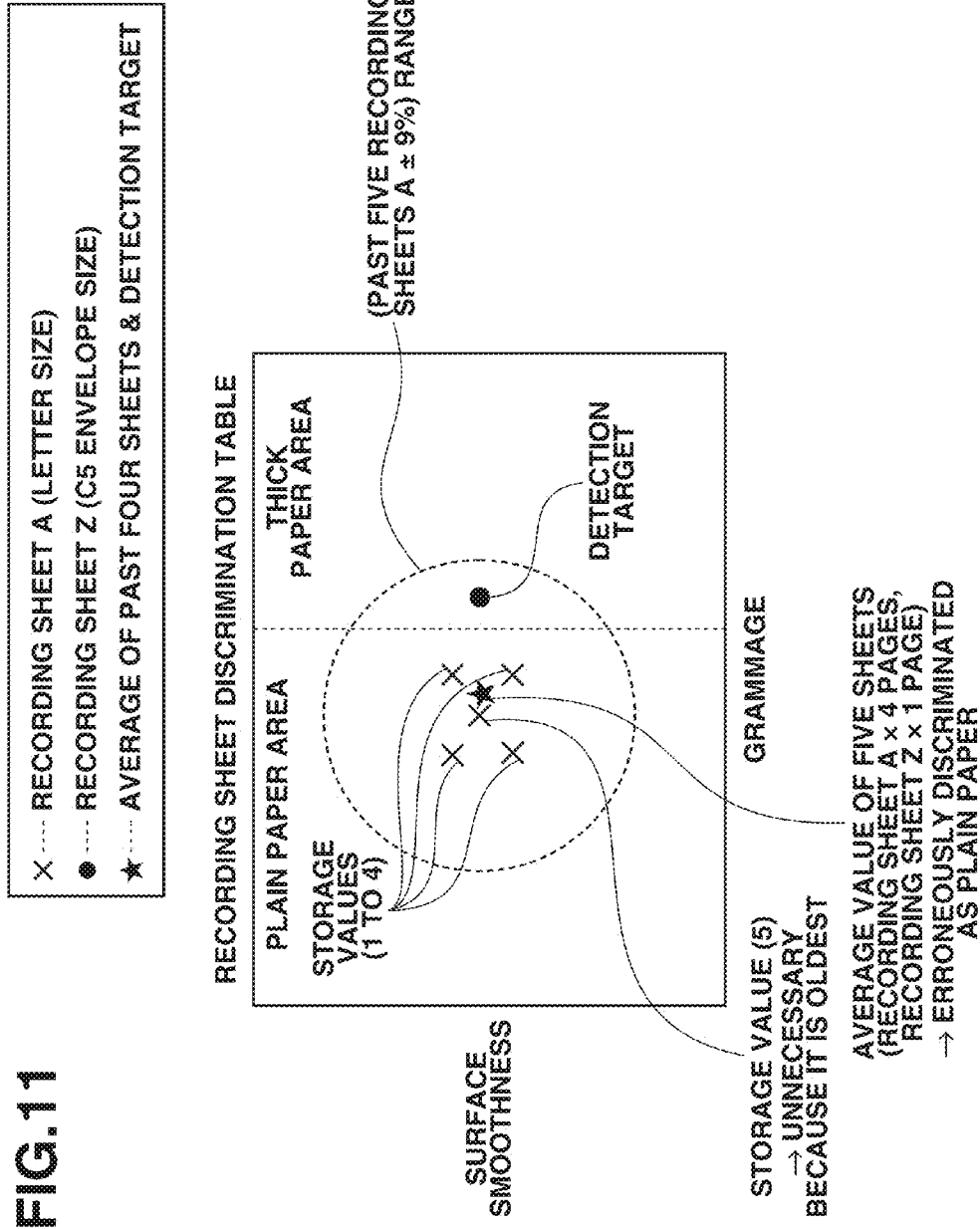
FIG. 11 illustrates a recording sheet discrimination table according to the third exemplary embodiment of the present invention.

The reason will be described in detail below with reference to FIG. 11. FIG. 11 illustrates a recording sheet discrimination table, which can be used by the discrimination unit 35 to discriminate the type of each recording sheet P. If there are two different types of recording sheets that are similar to each other in output values relating to grammage and surface property, there will be a possibility that the control unit 10 erroneously discriminates the recording sheet as being different type depending on the storage values of five sheets having been stored in the storage unit 33 in the past.

For example, it is assumed that the image forming apparatus prints five recording sheets A (letter size) in the job initially performed after the power source has been turned on and then prints one recording sheet Z (C5 envelope size) in another job. In this case, the discrimination unit 35 determines the recording sheet Z as a plain paper that is identical to the recording sheet A in type, even though the recording sheet A is inherently classified into the plain paper and the recording sheet Z is inherently classified into the thick paper, because the recording sheet A and the recording sheet Z are similar to each other in the output values relating to grammage and surface property as illustrated in FIG. 11. Further, at the time of starting an image forming operation for the recording sheet Z, the storage unit 33 stores storage values (1 to 5) of five recording sheets A. In this state, a new output value obtained when the recording sheet Z has been detected is included in the range of the comparison value±9%.

Therefore, in the present exemplary embodiment, considering a higher possibility that two recording sheets will be different in type if they are different in size, the control unit 10 causes the storage unit 33 to store storage values for each recording sheet size code L of the recording sheet P. The control performed by the control unit 10 according to the present exemplary embodiment can prevent the storage values of a different type of recording sheet from being used in discriminating the type of a recording sheet. According to the example illustrated in FIG. 11, at the time of starting an image forming operation for the recording sheet Z, there is not any storage value relating to the C5 envelope size. Therefore, it becomes feasible to determine the recording sheet Z as a thick paper (i.e., an optimum image forming condition).

As mentioned above, the image forming apparatus according to the present exemplary embodiment compares a detection result of the target recording sheet P with past detection results (i.e., storage values) of the latest five sheets that are identical to the recording sheet P in size and determines a discrimination value to be used in the discrimination of the type with reference to the comparison result. More specifically, the image forming apparatus according to the present exemplary embodiment can accurately discriminate the type of each recording sheet by using past detection results (i.e., storage values) relating to the same size if necessary and can form a high-quality image based on the discrimination result.

In the present exemplary embodiment, the size acquisition unit 36 acquires the size of the recording sheet P from the host computer 60. However, the size acquisition unit 36 is not limited to the above-mentioned example. For example, in a case where a user can set the size of the recording sheet P via an operation panel (not illustrated) of the image forming apparatus 1, the size acquisition unit 36 can be configured to acquire the size of the recording sheet P set via the operation panel. Further, the cassette 2 can be configured to include a regulating plate serving as a regulation unit configured to regulate a rear end or both ends of each accommodated recording sheet P. The control unit 10 can be configured to detect the size of the recording sheet P based on the position of the regulating plate. Further, the size acquisition unit 36 can be configured to acquire the detected size of the recording sheet P.

Further, in the present exemplary embodiment, the storage unit 33 records the detection results of the recording sheets P for respective recording sheet sizes acquired from the size acquisition unit 36. However, the storage unit 33 is not limited to the above-mentioned example. For example, the control unit 10 can detect the length of the recording sheet P in the conveyance direction thereof based on the conveyance speed of the recording sheet P, and the detection timing of the front end and the rear end of each recording sheet P obtained by a specific sensor during an image forming operation. In this case, the storage unit 33 can be configured to record the detection result of the recording sheet P for each length of the detected recording sheet P in the conveyance direction thereof.

Next, a method for discriminating the recording sheet P according to a fourth exemplary embodiment will be described in detail below. The discrimination method according to the fifth exemplary embodiment includes some features similar to those described in the first exemplary embodiment. Therefore, only unique features not described in the first exemplary embodiment will be described in detail below. In the present exemplary embodiment, the control unit 10 causes the storage unit 33 to store detection results (i.e., storage values) for each user and uses storage values that belong to the same user.

Figure 12A:
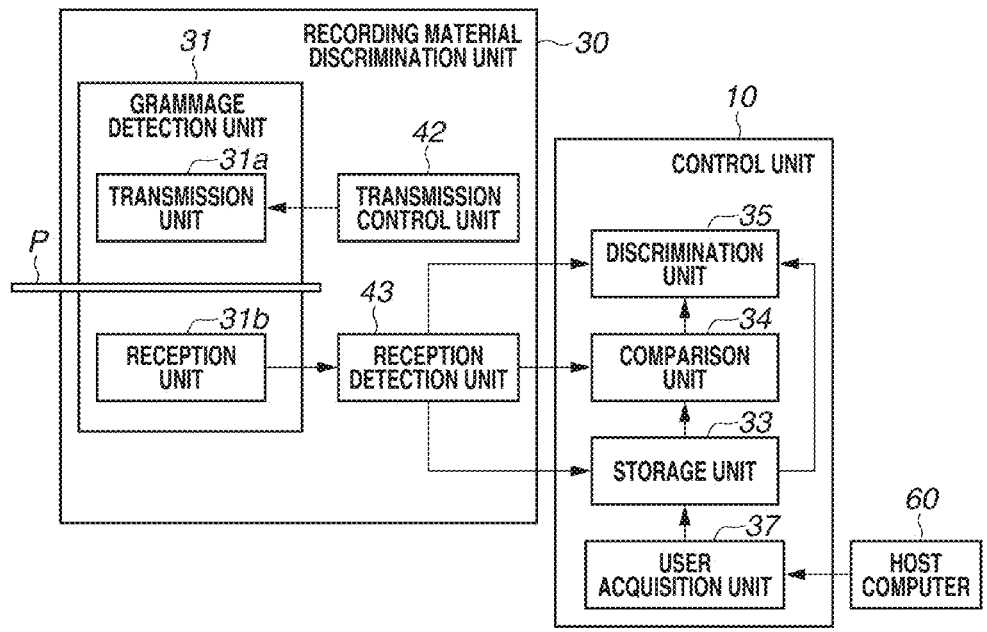
FIGS. 12A and 12B are block diagrams each illustrating a control system for the recording material discrimination unit according to a fourth exemplary embodiment of the present invention.
Figure 12B:
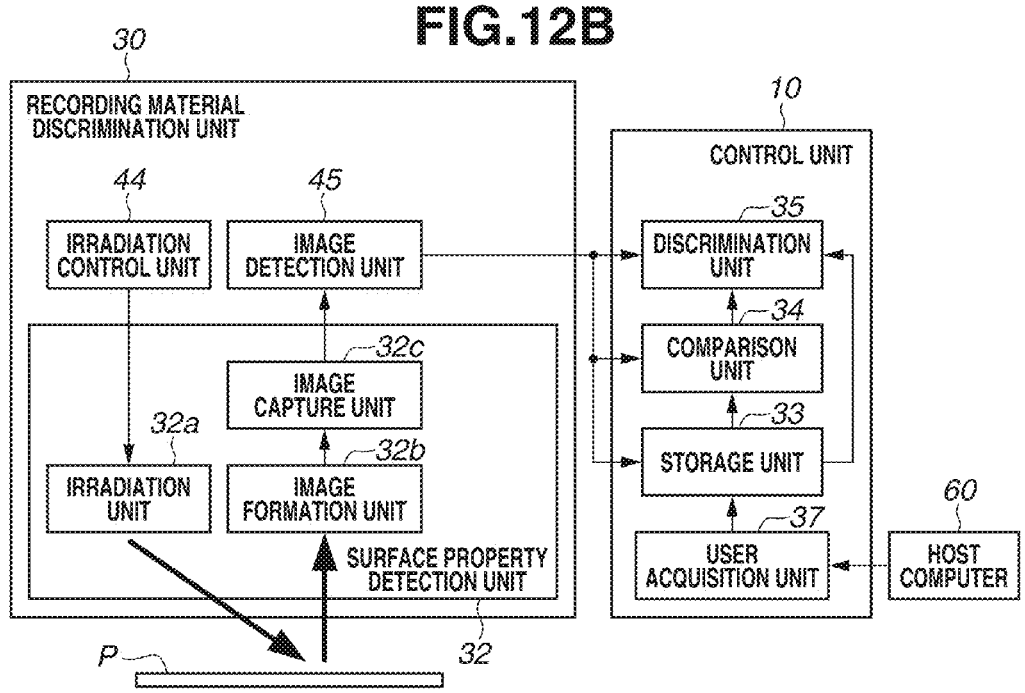

The control unit 10 that can control the image forming condition of the recording sheet P according to the present exemplary embodiment will be described in detail below FIGS. 12A and 12B. FIG. 12A is a block diagram illustrating a control system for the unit 30 that is constituted by the grammage detection unit 31. FIG. 12B is a block diagram illustrating a control system for the unit that is constituted by the surface property detection unit 32. In the present exemplary embodiment, the unit 30 can be configured to include at least one of the detection unit 31 and the detection unit 32.

The control unit 10 according to the present exemplary embodiment includes the storage unit 33, the comparison unit 34, the discrimination unit 35, and a user acquisition unit 37. The user acquisition unit 37 can acquire a user code that can identify a user who has requested the image formation from the host computer 60 that instructs the apparatus 1 to perform an image forming operation, before the apparatus 1 starts an image forming operation. The storage unit 33 stores detection results obtained by the detection unit 32 for each user code U (for identification information about each user) acquired by the user acquisition unit 37, as illustrated in FIG. 13.

The table illustrated in FIG. 13 stores detection results (i.e., storage values) for each of 26 users. In FIG. 9, the number of users is a mere example. Therefore, the number of users can be greater than 26 if there is a sufficient storage space in the storage unit 33. Further, it is feasible to allocate a plurality of persons to one user. The comparison unit 34 compares a new detection result obtained by the detection unit 32 with the past detection results stored in the storage unit 33 that belong to the user code U of the user who has requested the image formation. The discrimination unit 35 discriminates the type of the recording sheet P with reference to the comparison result obtained by the comparison unit 34.

Figure 14B:
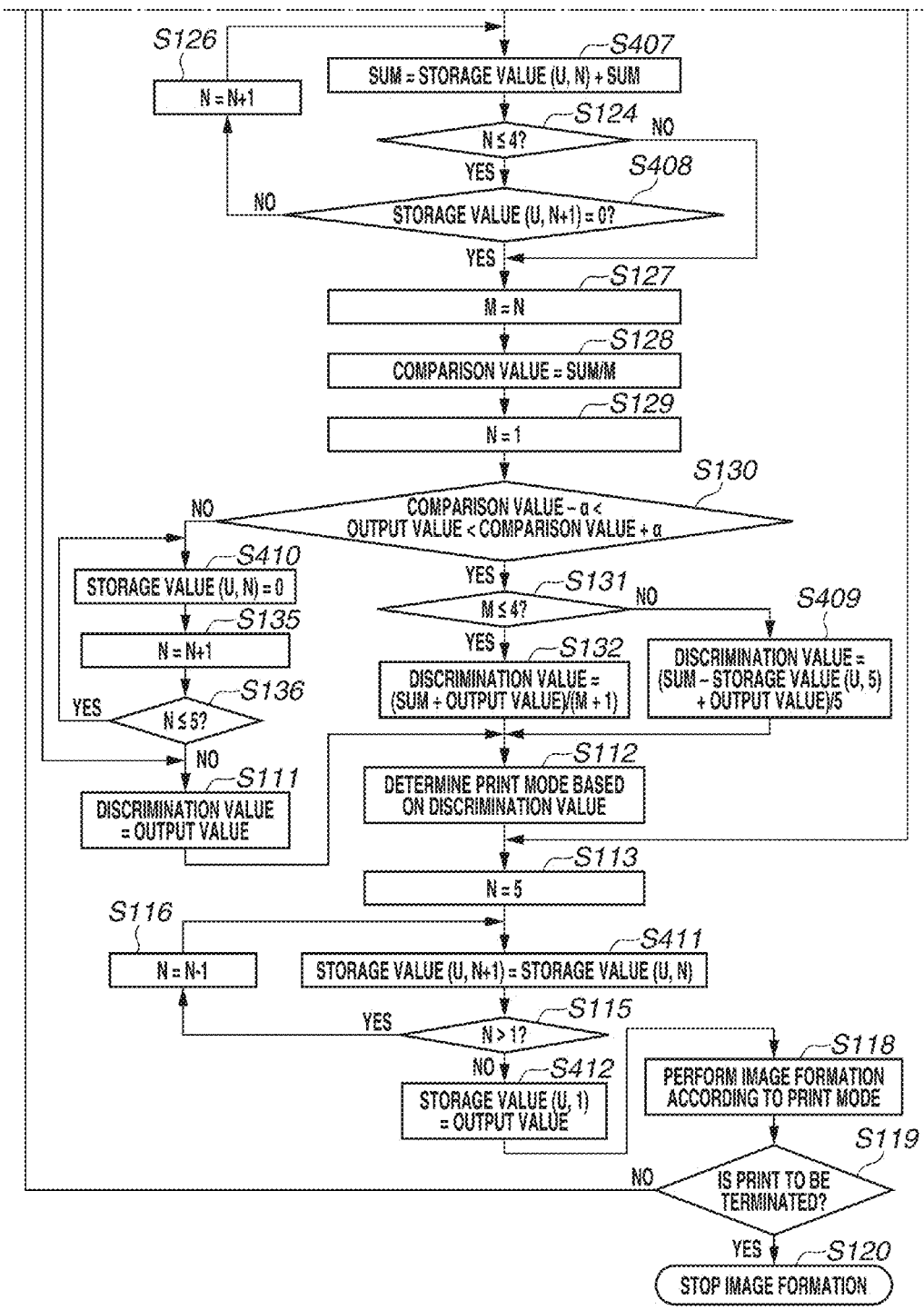

FIG. 14 is a flowchart illustrating image formation processing that can be performed by the control unit 10 according to the present exemplary embodiment. The control unit 10 performs control according to the flowchart illustrated in FIG. 14 based on the program stored in the ROM (not illustrated). The flowchart illustrated in FIG. 14 is different from the flowchart illustrated in FIG. 4 in the processing of the control unit 10 that performs a work for initializing the data stored in the storage unit 33 when the present job is the job initially performed after the power source has been turned on (see steps S401 to S404). Further, the flowchart illustrated in FIG. 14 is characteristic in that the control unit 10 acquires a user code U of a user who has requested the image formation from the user acquisition unit 37 (see step S405) and the control unit 10 refers to the storage values corresponding to respective user codes U stored in the storage unit 33 (see steps S406 to S412). In the present exemplary embodiment, the storage unit 33 can store storage values of five sheets for each user code. In respective steps S103, S401 to S404, S105, and S106, the control unit 10 initializes all data of 130 sheets (=26 users×five sheets). Next, in step S405, the control unit 10 acquires the user code U of the user who has requested the image formation from the user acquisition unit 37. In the following steps S406 to S412, the control unit 10 uses the past storage values stored in the storage unit 33 that belong to the same user code U.

The reason is as follows. Each user will set the same type of recording sheets P on the tray 3 when the user requests image formation. On the other hand, a different user may set a different type of recording sheet P on the tray 3. Therefore, in the present exemplary embodiment, considering a possibility that different users may use different types of recording sheets, the control unit 10 causes the storage unit 33 to store detection results (i.e., storage values) for each user code U of a user who has requested the image formation. The control performed by the control unit 10 according to the present exemplary embodiment can prevent the storage values of a different type of recording sheet from being used in discriminating the type of each recording sheet P.

As mentioned above, the image forming apparatus according to the present exemplary embodiment compares a detection result of the target recording sheet P with past detection results (i.e., storage values) of the latest five sheets that belong to the same user and determines a discrimination value to be used in the discrimination of the type with reference to the comparison result. More specifically, the image forming apparatus according to the present exemplary embodiment can accurately discriminate the type of each recording sheet by using past detection results that belong to the same user if necessary and can form a high-quality image based on the discrimination result.

In the present exemplary embodiment, the user acquisition unit 37 acquires user identification information from the host computer 60. However, the user acquisition unit 37 is not limited to the above-mentioned example. For example, the control according to the present exemplary embodiment is employable in a case where the apparatus 1 includes a user identification unit (not illustrated), if the user acquisition unit 37 can acquire user identification information from an ID card.

Next, a method for discriminating the recording sheet P according to a fifth exemplary embodiment will be described in detail below. The method according to the fifth exemplary embodiment includes some features similar to those described in the first exemplary embodiment. Therefore, only unique features not described in the first exemplary embodiment will be described in detail below. An image forming apparatus according to the present exemplary embodiment stores information about image formation date and time in addition to the detection results (i.e., the storage values) in the storage unit 33 and uses only the storage values when elapsed time since the execution of the image forming operation is within a predetermined time.

Figure 15A:
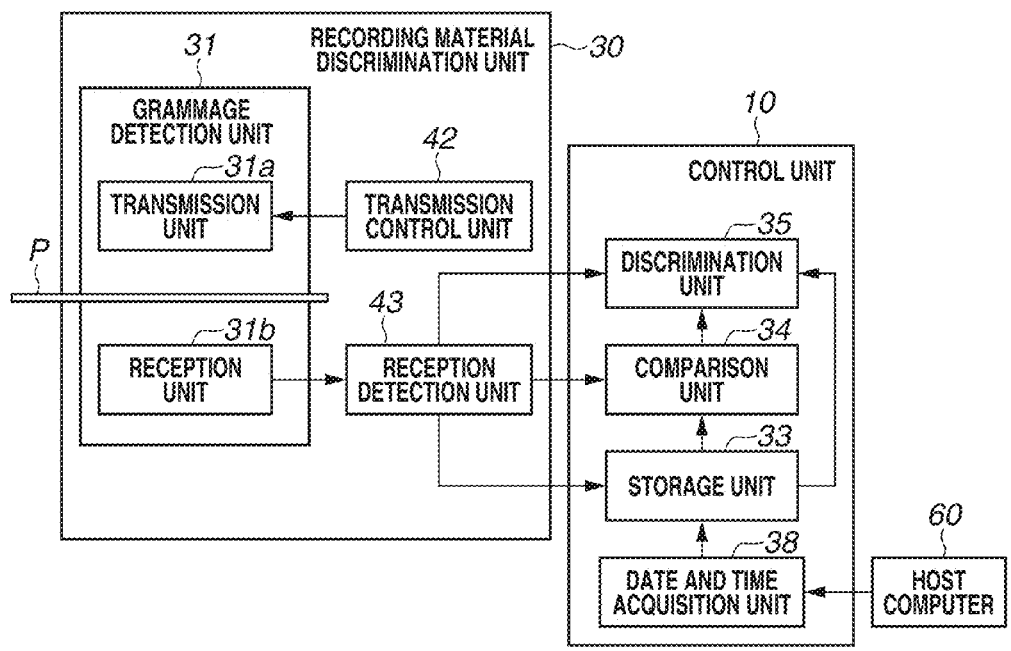
FIGS. 15A and 15B are block diagrams each illustrating a control system for the recording material discrimination unit according to a fifth exemplary embodiment of the present invention.
Figure 15B:
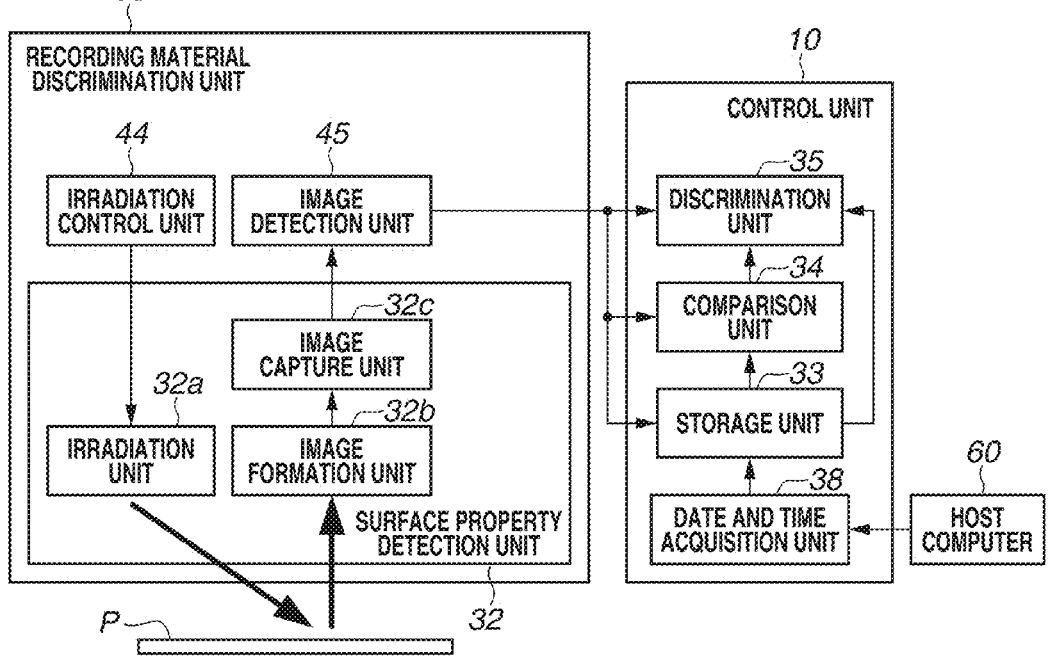

The control unit 10 that can control the image forming condition of the recording sheet P according to the present exemplary embodiment will be described with reference to FIGS. 15A and 15B. FIG. 15A is a block diagram illustrating a control system for the unit 30 that is constituted by the grammage detection unit 31. FIG. 5B is a block diagram illustrating a control system for the unit 30 that is constituted by the surface property detection unit 32. In the present exemplary embodiment, the unit 30 can be configured to include at least one of the detection unit 31 and the detection unit 32.

The control unit 10 according to the present exemplary embodiment includes the storage unit 33, the comparison unit 34, the discrimination unit 35, and a date and time acquisition unit 38. Before the apparatus 1 starts an image forming operation, the date and time acquisition unit 38 can acquire the date and time when image formation is requested from the host computer 60 that instructs the apparatus 1 to perform the image forming operation. The storage unit 33 stores the date and time information acquired from the date and time acquisition unit 38 together with detection results (i.e., storage values) obtained by the detection unit 32 as illustrated in FIG. 16. The comparison unit 34 compares a new detection result obtained by the detection unit 32 with the past detection results stored in the storage unit 33 that have been obtained within a predetermined time since the execution of the image forming operation. The discrimination unit 35 discriminates the type of the recording sheet P with reference to the comparison result obtained by the comparison unit 34.

Figure 17B:
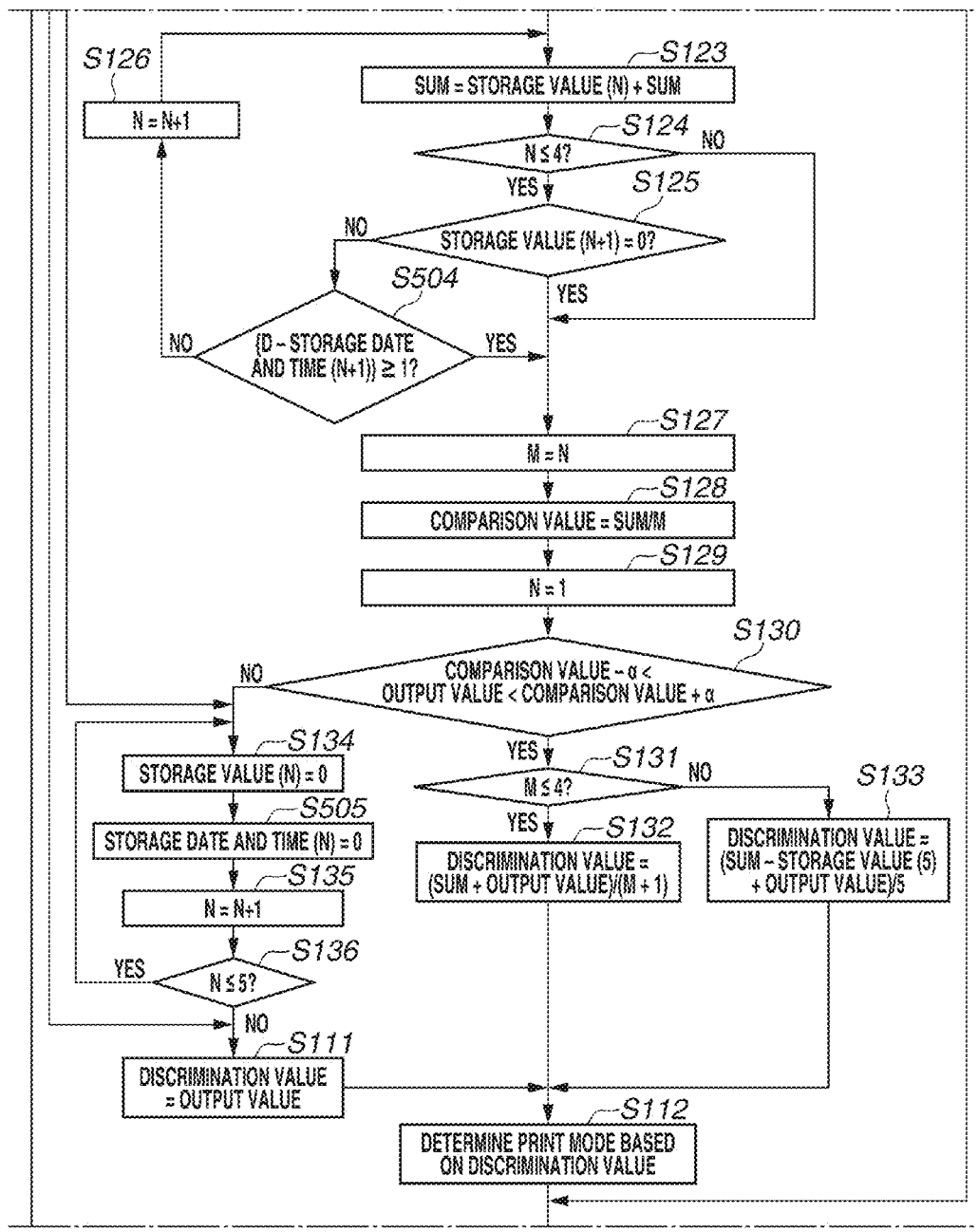
Figure 17C:
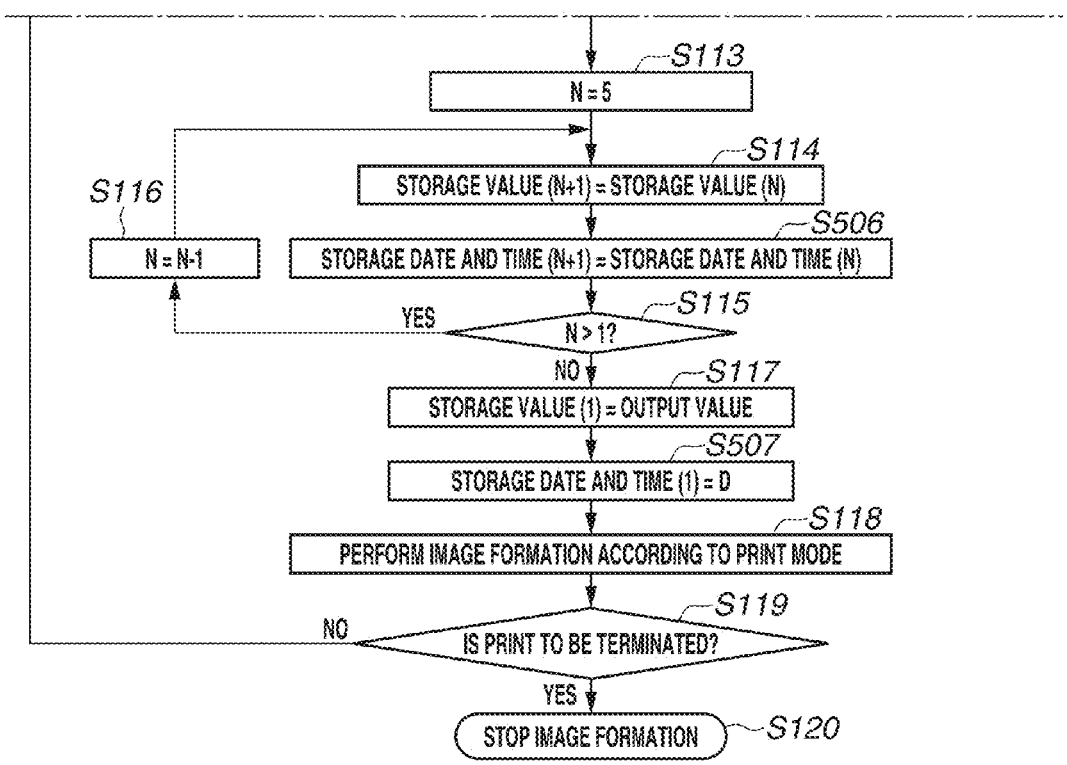

FIG. 17 is a flowchart illustrating image formation processing that can be performed by the control unit 10 according to the present exemplary embodiment. The control unit 10 performs control according to the flowchart illustrated in FIG. 17 based on the program stored in the ROM (not illustrated). The flowchart illustrated in FIG. 17 is different from the flowchart illustrated in FIG. 4 in the processing of the control unit 10 that performs a work for initializing the data stored in the storage unit 33 when the present job has been initially performed after the power source has been turned on (see steps S103 to S106). In step S104, the control unit 10 initializes the storage values relating to the surface property of the recording sheet P. In step S501, the control unit 10 initializes the storage date and time. Subsequently, in step S502, the control unit 10 acquires image formation request date and time D from the date and time acquisition unit 38. In steps S107 to S109, the control unit 10 causes the apparatus 1 to feed the recording sheet P and instructs the unit 30 to detect the recording sheet P and output corresponding output values. Then, if the storage value (1) is 0 (YES in step S110), the operation proceeds to step S111. If the storage value (1) is not 0, namely when at least one output value is already stored in the storage unit 33 (NO in step S110), the operation proceeds to step S503. In step S503, the control unit 10 determines whether at least one day has elapsed since the storage of the storage value (1) with reference to the present date and time D and the latest storage date and time (1) acquired by the date and time acquisition unit 38. If the time elapsed since the storage of the storage value (1) is equal to or greater than one day (i.e., longer than the predetermined time) (YES in step S503), then in steps S134 to S136 and step S505, the control unit 10 performs processing for discarding and initializing the storage values and the storage date and time data stored in the storage unit 33. On the other hand, if the time elapsed since the storage of the storage value (1) is less than one day (i.e., equal to or less than the predetermined time), the operation proceeds to step S121. In the present exemplary embodiment, one day is a mere example of the period determined beforehand.

In steps S122 to S128 and step S504, the control unit 10 calculates an average value of the storage values stored in the storage unit 33. More specifically, in step S504, the control unit 10 determines whether the time elapsed since the past image forming operation is equal to or greater than one day based on the present date and time D and the past storage date and time (N+1) acquired by the date and time acquisition unit 38. Then, the control unit calculates an average value of the storage values obtained within the past one day. Further, in steps S113 to S116 and step S506, the control unit 10 repeats a work for updating the storage data of the five sheets from storage value (N) to storage value (N+1) and a work for updating the date and time information from storage date and time (N) to storage date and time (N+1). Further, in step S117, the control unit 10 stores the output value of the presently detected recording sheet P as the storage value (1). Then, in step S507, the control unit 10 records the present date and time D as recording date and time (1).

The reason is as follows. If the time elapsed since the past image forming operation is relatively short, there is a higher possibility that a user sets the same type of recording sheet P on the tray 3 and requests an image forming operation. On the other hand, if a relatively long time has elapsed since the execution of the image forming operation, there is a higher possibility that a different type of recording sheet P is set on the tray 3. Therefore, in the present exemplary embodiment, the control unit 10 stores information about the image formation request date and time D beforehand, together with the storage values, in the storage unit 33. The control performed by the control unit 10 can prevent the storage values of a different type of recording sheet from being used in discriminating the type of each recording sheet. For example, in a state where the storage unit 33 stores the storage values together with the storage date and time information as illustrated in FIG. 16, if the present date and time D acquired by the date and time acquisition unit 38 is 2015/4/10 15:00:00, the control unit 10 uses three storage values A(1) to A(3) as past detection results because the time elapsed since the storage of the data is less than one day.

As mentioned above, the image forming apparatus according to the present exemplary embodiment compares a detection result of the target recording sheet P with the past detection results (i.e., storage values) of the latest five sheets recording within a predetermined time and determines a discrimination value to be used in the discrimination of the type with reference to the comparison result. More specifically, the image forming apparatus according to the present exemplary embodiment can accurately discriminate the type of each recording sheet by using the detection results stored within the predetermined time if necessary and can form a high-quality image based on the discrimination result.

In the present exemplary embodiment, the date and time acquisition unit 38 acquires the image formation request date and time D from the host computer 60. However, the configuration of the date and time acquisition unit 38 is not limited to the above-mentioned example. For example, the control according to the present exemplary embodiment is applicable if the date and time acquisition unit 38 can be configured to acquire image formation date and time information by referring to a timer managed by the CPU that controls the apparatus 1.

In the above-mentioned first to fifth exemplary embodiments, the control unit 10 initializes all data stored in the storage unit 33 if the present job is the job initially performed after the power source has been turned on. Alternatively, it is feasible to export the data of the storage unit 33 beforehand to a nonvolatile memory and update the storage content of the storage unit 33 with the values stored in the nonvolatile memory when the job is initially performed after the power source has been turned on, so that the past detection results can be effectively used.

In the above-mentioned first to fifth exemplary embodiments, the threshold value α is a constant ratio irrespective of the type of each recording sheet P. However, it is feasible to set the threshold value α according to the storage value stored in the storage unit 33 or the output value. As an example, the threshold value α can be set to a larger value if the variation in detecting the recording sheet P is large. On the other hand, the threshold value α can be set to a smaller value if variation in detecting the recording sheet P is small. In other words, it is feasible to optimize the region in discriminating the type of each recording sheet P. More specifically, the control unit 10 can calculate a dispersion value of a plurality of output values and can set the threshold value α based on the calculated dispersion value.

In the above-mentioned first to fifth exemplary embodiments, it is assumed that the recording sheet P is supplied from the tray 3. However, the recording sheet P can be supplied from the cassette 2. The present invention is employable even in a case where a user pulls out the cassette 2 from the apparatus 1 and performs exchange or addition of recording sheets. The control unit 10 can compare the present detection result with the past detection results and effectively use the past detection results. Further, the past detection results can be effectively used by sharing the past detection results between the tray 3 and the cassette 2.

In the above-mentioned first to fifth exemplary embodiments, if a differential value between a newly obtained present output value and the comparison value is smaller than the threshold value α, the control unit 10 uses an average value of the detection results of the latest recording sheets P of up to five including the present output value, in discriminating the type of each recording sheet P. Alternatively, the control unit 10 can discriminate the type of each recording sheet P based on majority decision of the detection results of the latest recording sheets of up to five including the present output value. For example, if the detection results of the latest five recording sheets are plain paper, plain paper, thick paper, thick paper, and plain paper, the control unit 10 can determine that the type of the recording sheet P is plain paper based on majority decision. Alternatively, if the differential value between the present output value and the comparison value is smaller than the threshold value α, the control unit 10 can immediately determine that the type of the recording sheet P is identical to the type determined based on the past detection results. For example, in a case where the type of the recording sheet P determined based on the comparison value is plain paper, the control unit 10 can determine that the present recording sheet is plain paper if the output value is closes to the comparison value. More specifically, the control unit 10 can discriminate the type of each recording sheet P based on at least the comparison value.

In the above-mentioned first to fifth exemplary embodiments, the recording material discrimination unit 30 is fixed to the image forming apparatus 1. However, the unit 30 can be configured to be attachable to or detachable from the apparatus 1. In a case where the unit 30 is configured to be attachable or detachable, it is feasible for a user to replace the unit 30 with a new one, for example, if the unit 30 has failed. Alternatively, the unit 30 can be configured to be simply addable to the apparatus 1.

Figure 7A:
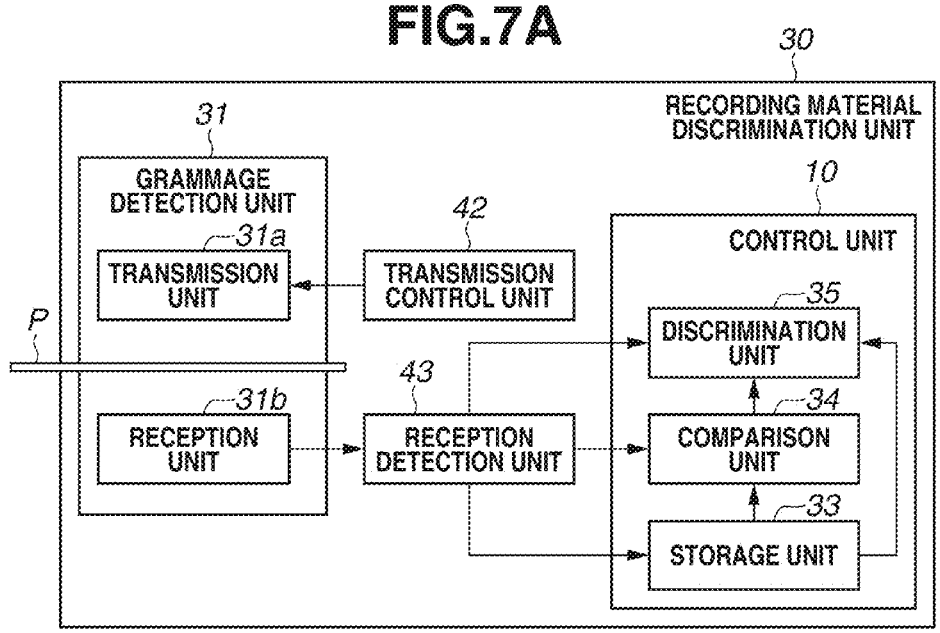
FIGS. 7A and 7B are block diagrams each illustrating a control system for the recording material discrimination unit according to another exemplary embodiment the present invention.
Figure 7B:
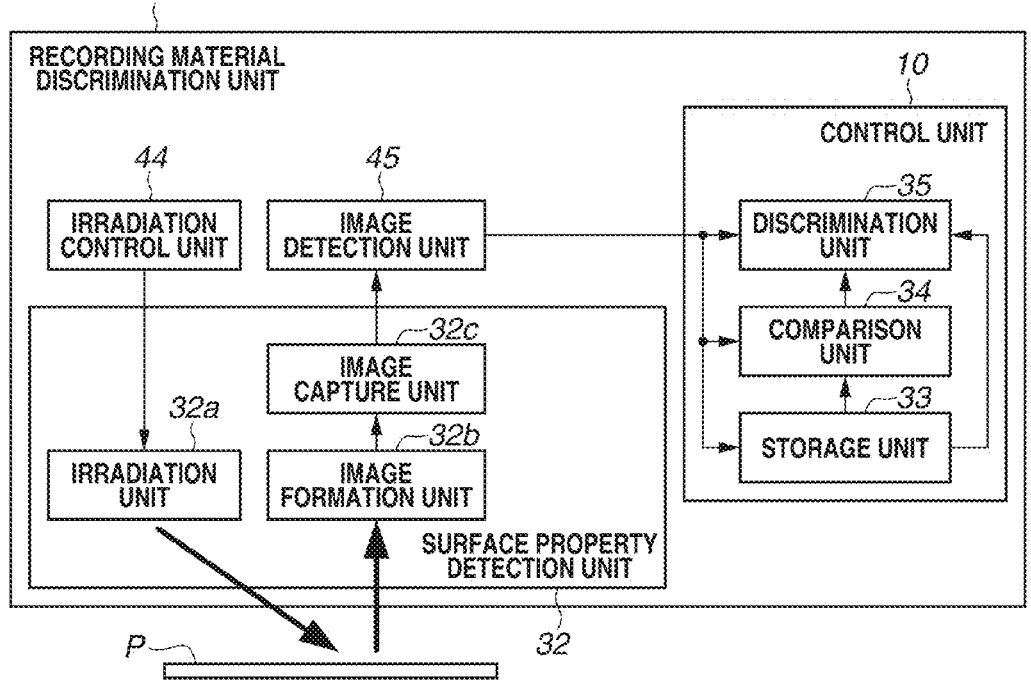

In the above-mentioned first to fifth exemplary embodiments, the recording material discrimination unit 30 and the control unit 10 can be integrated together as a single unit configured to be attachable to or detachable from the apparatus 1 as illustrated in FIGS. 7A and 7B. FIG. 7A is a block diagram illustrating the unit 30 constituted by the grammage detection unit 31. FIG. 7B is a block diagram illustrating the unit 30 constituted by the surface property detection unit 32. In a case where the unit 30 and the control unit 10 are integrated together and exchangeable as a single unit, a user can easily replace the installed sensor with an advanced sensor to update the functions of the unit 30. Alternatively, the unit 30 and the control unit 10 can be integrated together and configured to be simply addable to the apparatus 1.

In the above-mentioned first to fifth exemplary embodiments, the apparatus 1 is the laser beam printer. However, the present invention can be applied to any other image forming apparatus, such as an inkjet printer or a different-type copy machine.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application 2014-242584, filed Nov. 28, 2014, and No. 2015-177906, filed Sep. 9, 2015, which are hereby incorporated by reference herein in their entirety.

What is claimed is:

1. An image forming apparatus for forming an image on a recording material, the image forming apparatus comprising:
   a sensor configured to detect grammage of the recording material or surface property of the recording material, and output an output value according to a detection result; and
   a processor configured to control an image forming condition based on the output value output by the sensor,
   wherein, after the sensor detects a first recording material and outputs a first output value, the sensor detects a second recording material which is different from the first recording material and outputs a second output value,
   wherein the processor obtains a differential value between the first output value and the second output value, and
   in a case where the differential value is smaller than a predetermined threshold value, the processor controls the image forming condition with respect to the second recording material based on the first output value and the second output value, and
   in a case where the differential value is larger than the predetermined threshold value, the processor controls the image forming condition with respect to the second recording material based on the second output value without using the first output value.

2. The image forming apparatus according to claim 1, wherein in the case where the differential value is larger than the predetermined threshold value, the first output value is discarded.

3. The image forming apparatus according to claim 1, wherein in the case where the differential value is equal to the predetermined threshold value, the processor controls the image forming condition with respect to the second recording material based on the second output value without using the first output value.

4. The image forming apparatus according to claim 1, wherein, after the sensor detects a plurality of recording materials including the first recording material and outputs a plurality of output values including the first output value, the sensor detects the second recording material and outputs the second output value,
   wherein the processor obtains a differential value between an average value of the plurality of output values and the second output value, and
   in a case where the differential value is smaller than the predetermined threshold value, the processor controls the image forming condition with respect to the second recording material based on the plurality of output values and the second output value, and
   in a case where the differential value is larger than the predetermined threshold value, the processor controls the image forming condition with respect to the second recording material based on the second output value without using the plurality of output values.

5. The image forming apparatus according to claim 4, wherein the processor changes the predetermined threshold value according to a dispersion value of the plurality of output values.

6. The image forming apparatus according to claim 1, wherein, in a case where a size of the first recording material and a size of the second recording material are identical to each other and the differential value between the first output value and the second output value is smaller than the predetermined threshold value, the processor controls the image forming condition with respect to the second recording material based on the first output value and the second output value, and
   in a case where the size of the first recording material is different from the size of the second recording material or the differential value is equal to or larger than the predetermined threshold value, the processor controls the image forming condition with respect to the second recording material based on the second output value without using the first output value.

7. The image forming apparatus according to claim 1, wherein, in a case where a first user who has requested the image formation on the first recording material and a second user who has requested the image formation on the second recording material are identical to each other and the differential value between the first output value and the second output value is smaller than the predetermined threshold value, the processor controls the image forming condition with respect to the second recording material based on the first output value and the second output value, and
   in a case where the first user is different from the second user or the differential value is equal to or larger than the predetermined threshold value, the processor controls the image forming condition with respect to the second recording material based on the second output value without using the first output value.

8. The image forming apparatus according to claim 1, wherein the processor obtains an elapsed time from when the image formation is performed on the first recording material to when the image formation is performed on the second recording material, and
   wherein, in a case where the elapsed time is within a predetermined time and the differential value between the first output value and the second output value is smaller than the predetermined threshold value, the processor controls the image forming condition with respect to the second recording material based on the first output value and the second output value, and
   in a case where the elapsed time exceeds the predetermined time or the differential value is equal to or larger than the predetermined threshold value, the processor controls the image forming condition with respect to the second recording material based on the second output value without using the first output value.

9. The image forming apparatus according to claim 1, wherein the sensor includes a transmission unit element configured to transmit ultrasonic waves and a reception element configured to receive the ultrasonic waves transmitted by the transmission element, and the sensor outputs the output value according to the ultrasonic waves received by the reception element via the recording material when the ultrasonic waves have been transmitted by the transmission element.

10. The image forming apparatus according to claim 9, wherein the transmission element and the reception element are disposed in an opposed relationship, and the reception element is configured to receive ultrasonic waves having been transmitted by the transmission element and having permeated through the recording material.

11. The image forming apparatus according to claim 1, wherein the sensor includes an irradiation element configured to emit light and a light receiving element configured to receive the light emitted by the irradiation element, and the sensor outputs the output value according to the light received by the light receiving element via the recording material after the emission of the light by the irradiation element.

12. The image forming apparatus according to claim 11, wherein the light receiving element is configured to receive light having reflected on the recording material after the emission of the light by the irradiation element.

13. The image forming apparatus according to claim 11, wherein the light receiving element is configured to receive light having permeated through the recording material after the emission of the light by the irradiation element.

14. The image forming apparatus according to claim 11, wherein the light receiving element is an imaging element configured to capture an image of the received light.

15. The image forming apparatus according to claim 1, further comprising:
   a memory configured to store a plurality of latest output values output by the sensor.

16. The image forming apparatus according to claim 1, further comprising:
   a memory configured to store the output value output by the sensor when a first conveyed recording material in a job has been detected by the sensor.

17. The image forming apparatus according to claim 1, wherein the image forming condition is temperature of a fixing unit that fixes an image on the recording material, voltage applied to a transfer unit, current flowing across the transfer unit, or conveyance speed of the recording material.

* * * * *